United States Patent
Kondo et al.

(10) Patent No.: US 12,499,532 B2
(45) Date of Patent: Dec. 16, 2025

(54) COMPUTER AND VISUAL INSPECTION METHOD FOR IDENTIFYING DEFECTIVE PRODUCTS

(71) Applicant: Hitachi, Ltd., Tokyo (JP)

(72) Inventors: Naoaki Kondo, Tokyo (JP); Akira Ito, Tokyo (JP); Atsushi Miyamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 17/843,293

(22) Filed: Jun. 17, 2022

(65) Prior Publication Data

US 2023/0005120 A1 Jan. 5, 2023

(30) Foreign Application Priority Data

Jul. 1, 2021 (JP) .................................. 2021-110397

(51) Int. Cl.
*G06T 7/00* (2017.01)

(52) U.S. Cl.
CPC ..... *G06T 7/001* (2013.01); *G06T 2207/20081* (2013.01); *G06T 2207/20084* (2013.01); *G06T 2207/30164* (2013.01)

(58) Field of Classification Search
CPC ........... G06T 7/001; G06T 2207/20081; G06T 2207/20084; G06T 2207/30164
See application file for complete search history.

(56) References Cited

U.S. PATENT DOCUMENTS

2013/0336575 A1* 12/2013 Dalla-Torre ............ G06T 7/001
  382/149
2015/0369752 A1* 12/2015 Honda ............... G01N 21/9501
  356/237.2

(Continued)

FOREIGN PATENT DOCUMENTS

JP  2020-160616 A  10/2020
JP  2021143884  *  9/2021  ............. G01N 21/85

(Continued)

OTHER PUBLICATIONS

Jul. 2024 Subject Matter Eligibility Examples, Jul. 2024, USPTO, pp. 2-9 (Year: 2024).*

(Continued)

*Primary Examiner* — Michael P LaPage
(74) *Attorney, Agent, or Firm* — Crowell & Moring LLP

(57) ABSTRACT

The present invention includes image acquiring for acquiring an inspection image of a target object, pass/fail determining for determining whether the inspection image acquired in the image acquiring is the inspection image of a non-defect candidate or the inspection image of a defect candidate, overdetection determining for determining whether the inspection image determined as a defect candidate in the pass/fail determining is the inspection image of overdetection or the inspection image of non-overdetection which is not overdetection, non-defect estimation parameter learning for learning a non-defect estimation parameter used in the pass/fail determining using a learning non-defect image acquired in the image acquiring, and overdetection determination parameter learning for learning an overdetection determination parameter used in the overdetection determining using the learning non-defect image.

13 Claims, 16 Drawing Sheets

(56) References Cited

U.S. PATENT DOCUMENTS

| | | | |
|---|---|---|---|
| 2019/0065995 A1* | 2/2019 | Takayama | G06N 20/00 |
| 2020/0279359 A1* | 9/2020 | Kimura | G06T 1/60 |
| 2020/0311895 A1 | 10/2020 | Sakurai | |
| 2021/0027440 A1* | 1/2021 | Sakuyama | G01N 21/9515 |
| 2021/0247324 A1* | 8/2021 | Naruse | G06N 3/045 |
| 2022/0044383 A1* | 2/2022 | Koshihara | G06V 10/454 |
| 2022/0301140 A1* | 9/2022 | Kawamura | G06F 18/22 |
| 2024/0005477 A1* | 1/2024 | Tachi | G06T 7/0004 |

FOREIGN PATENT DOCUMENTS

| | | | | |
|---|---|---|---|---|
| WO | WO-2021181749 A1 * | 9/2021 | | G01N 21/88 |
| WO | WO-2021192376 A1 * | 9/2021 | | G01N 21/88 |

OTHER PUBLICATIONS

Dong et al., "Image Super-Resolution Using Deep Convolutional Networks", 2014, pp. 1-14, (14 pages).

* cited by examiner

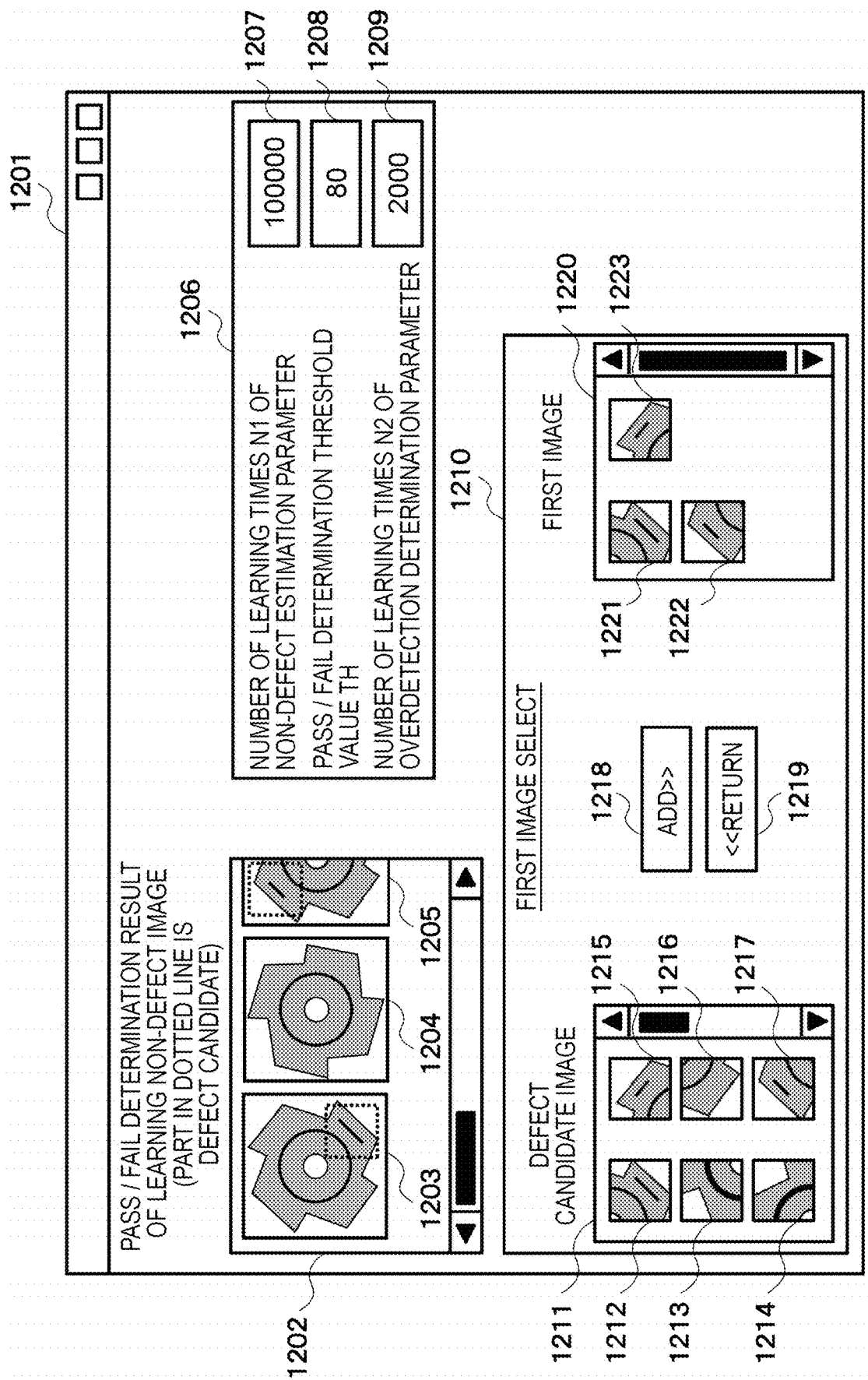

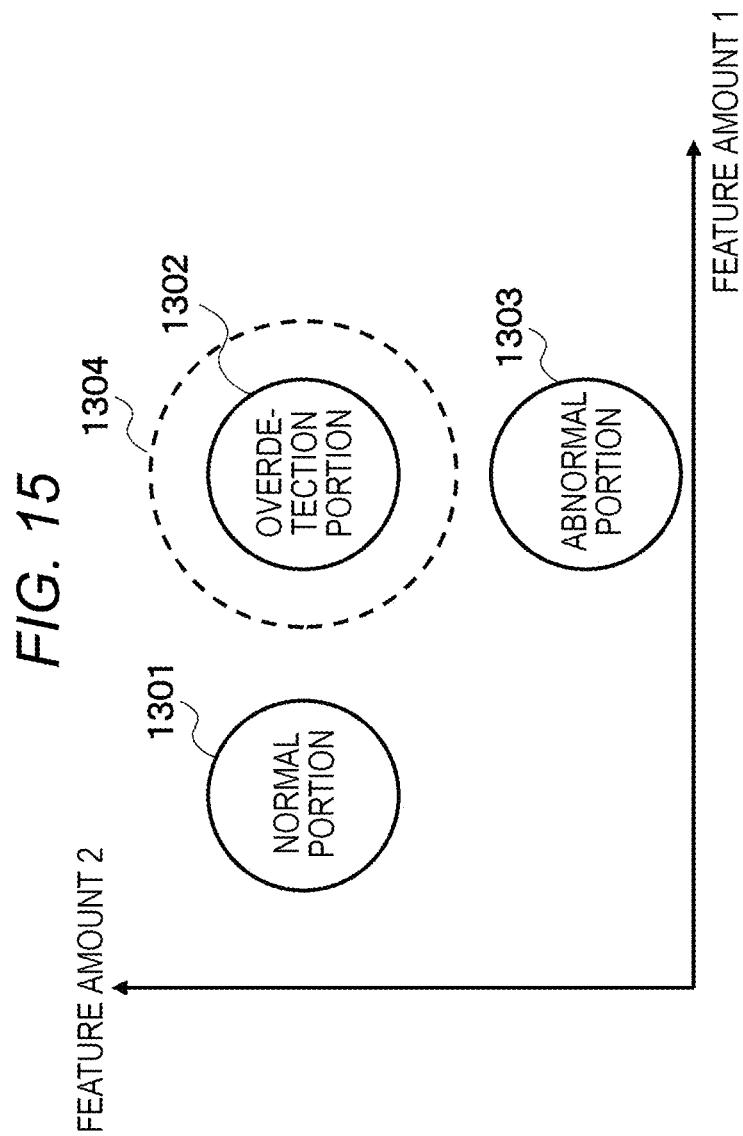

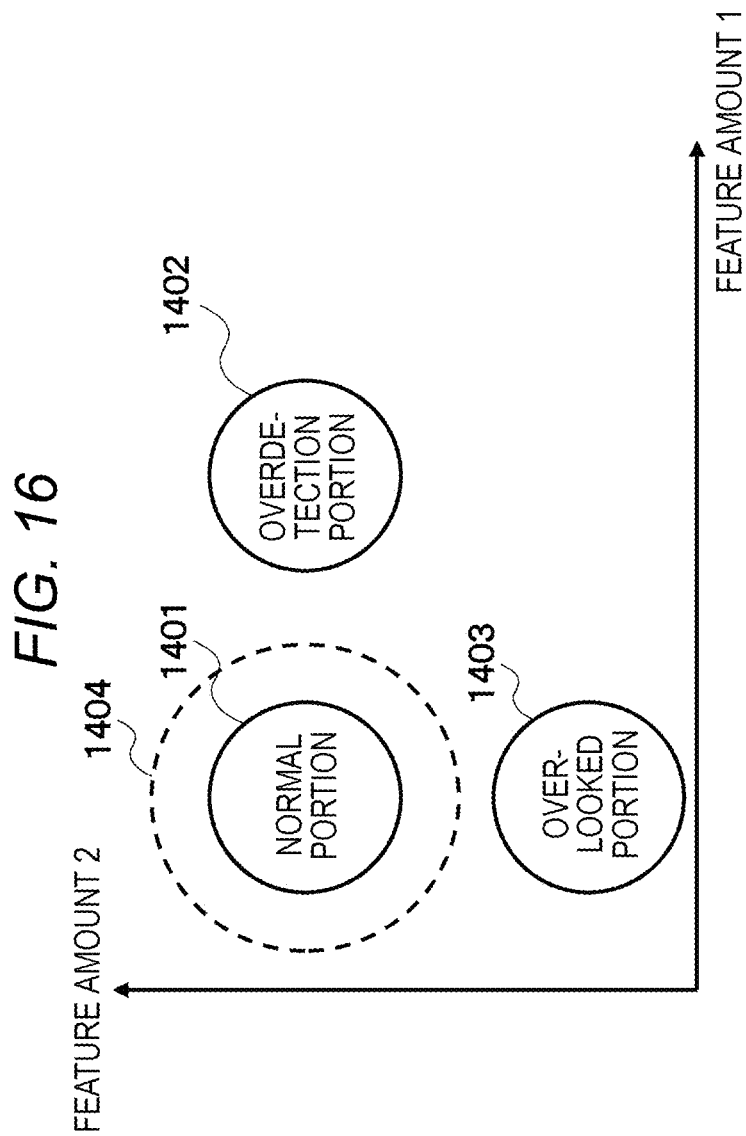

COMPUTER AND VISUAL INSPECTION METHOD FOR IDENTIFYING DEFECTIVE PRODUCTS

BACKGROUND OF THE INVENTION

1. Field of the Invention

The present invention relates to a computer and a visual inspection method.

2. Description of Related Art

The present invention preferably relates to a computer and a visual inspection method which are based on machine learning. The present invention provides a device and method to inspect whether an actual inspection target object is a non-defective product or a defective product by using a non-defect estimation parameter and an overdetection determination parameter learned from learning non-defect images acquired by imaging a non-defective product for learning in advance.

In many industrial products including machinery, metals, chemicals, foods, textiles, and the likes, based on inspection images, visual inspections are widely performed to inspect whether a product is a non-defective product or a defective product due to poor shape, poor assembly, adhesion of foreign matter, internal defects and fatality, scratches and spots on a surface, dirt, and the like. In general, most of these visual inspections have been performed by visual determination of an inspector.

With the increasing demand for mass production and quality improvement, an inspection cost and a load on an inspector are increasing. In addition, sensory inspections based on human senses require particularly high experience and skills. Personality and reproducibility, such as different evaluation values depending on an inspector and different results for each inspection, are also issues. There is a strong demand for automation of inspections to address issues such as inspection costs, skills, and personality.

In recent years, automatic visual inspections based on machine learning has been proposed. In the automatic visual inspections based on machine learning, correspondence between images of an inspection target object and determination results such as non-defect/defect taught by an inspector is learned.

At the time of learning, it is desirable to prepare a large number of images of non-defective products and images of defective products, but in an industrial product manufacturing line, collecting images of defective products requires a great deal of cost. Therefore, a visual inspection method has been proposed in which machine learning is performed using only images of non-defective products to inspect whether the inspection target object is a non-defective product or a defective product.

For example, in JP-A-2020-160616, a method of learning a neural network which outputs an image of a product without defects even when an image of a product with defects is input using an image of a product (non-defective product) without defects is disclosed.

However, in the automatic visual inspection method based on machine learning represented by JP-A-2020-160616, since there are variations in brightness and shape among non-defective products, a non-defective portion whose appearance is significantly different from that of a typical non-defective product is often detected (over-detected) as a defect. Basically, in order to feed back countermeasures based on the content of defects to a manufacturing process, an inspector will check images detected by a visual inspection device as defects, but when the number of overdetections is large, the load on the inspector to check the images increases. Therefore, there is a need for a visual inspection method which reduces overdetection when learning using only images of non-defective products.

In addition, there are variations in brightness and shape among defective products, so defective portions that are similar in appearance to those of the non-defective products are often determined (defect-overlooking) as non-defects. When a defect is overlooked, not only that it not be possible to provide feedback to the manufacturing process, but there is also the risk of shipping defective products. Therefore, when learning using only images of non-defective products, there is a need for a visual inspection method that reduces overlooking of defects.

SUMMARY OF THE INVENTION

The present invention is made in view of the problems described above, and an object of the present invention is to provide a computer and a visual inspection method capable of inspecting whether an inspection target object is a non-defective product or a defective product with high accuracy.

To solve the problems described above, a computer which follows one aspect of the present invention is a computer which determines whether a target object is a non-defective product or a defective product. The computer has a processor and the processor executes image acquiring for acquiring an inspection image of the target object, pass/fail determining for determining whether the inspection image acquired in the image acquiring is the inspection image of a non-defect candidate or the inspection image of a defect candidate, overdetection determining for determining whether the inspection image determined as a defect candidate in the pass/fail determining is the inspection image of overdetection or the inspection image of non-overdetection which is not overdetection, non-defect estimation parameter learning for learning a non-defect estimation parameter used in the pass/fail determining using a learning non-defect image acquired in the image acquiring, and overdetection determination parameter learning for learning an overdetection determination parameter used in the overdetection determining using the learning non-defect image, and in the overdetection determination parameter learning, by using the learning non-defect image as the inspection image in the pass/fail determining, the overdetection determination parameter is learned such that, in the pass/fail determining, the inspection image of a non-defect candidate is determined as the inspection image of non-overdetection and the inspection image of a defect candidate is determined as the inspection image of overdetection.

According to the present invention, it is possible to realize a computer and a visual inspection method capable of inspecting whether an inspection target object is a non-defective product or a defective product with high accuracy.

BRIEF DESCRIPTION OF THE DRAWINGS

FIG. 14 is a diagram illustrating a GUI which displays a screen for inputting a learning frequency and a pass/fail determination threshold value and selecting a first image from defect candidate images by the visual inspection device according to the first example or the second example;

FIG. 15 is a schematic diagram of distribution of a normal portion, an overdetection portion, and an abnormal portion in a visual inspection method according to an embodiment; and FIG. 16 is a schematic diagram of distribution of a normal portion, an overdetection portion, and an overlooked portion in the visual inspection method according to the embodiment.

DESCRIPTION OF EMBODIMENTS

Figure 1:
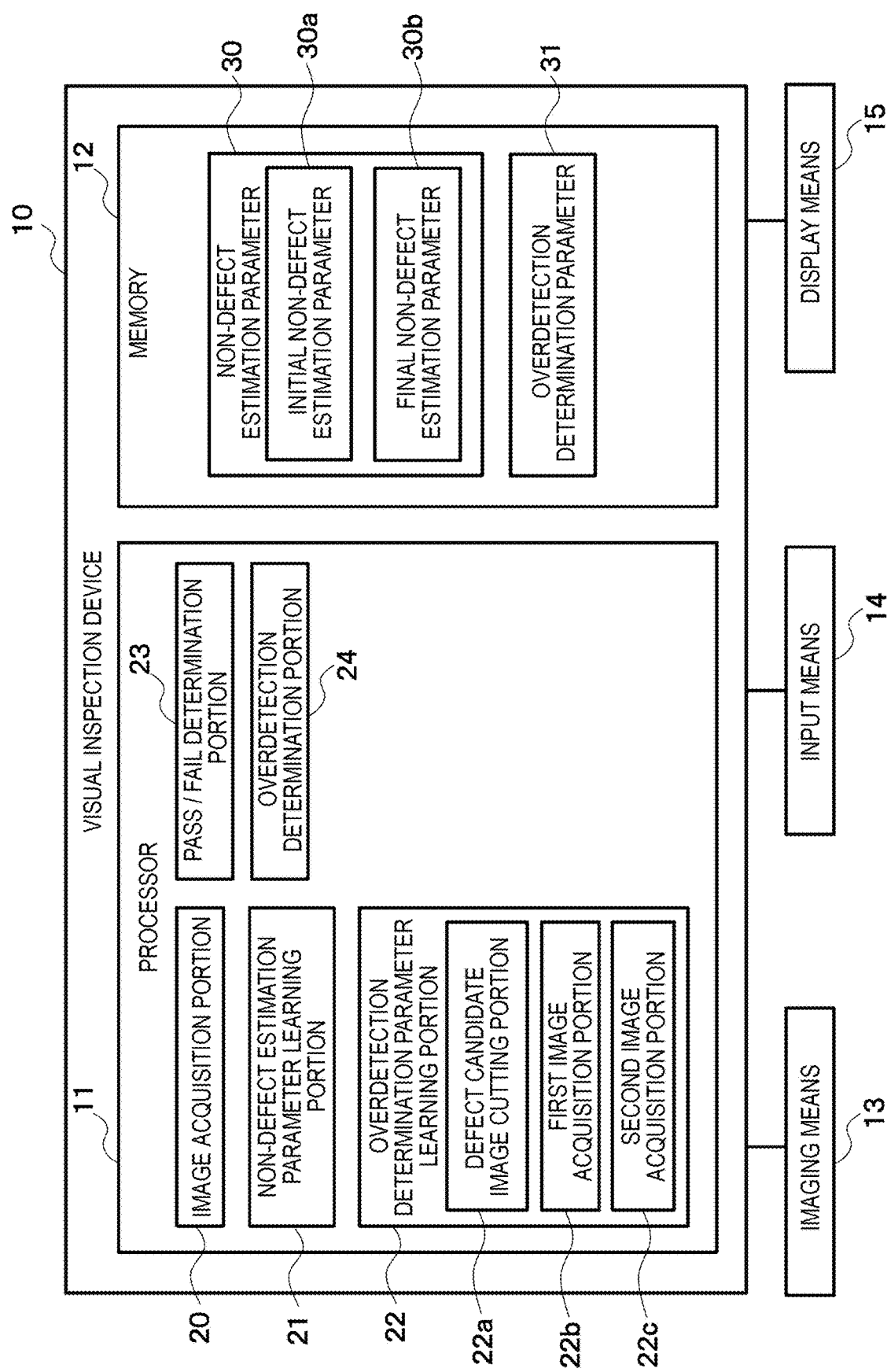
FIG. 1 is a diagram illustrating a schematic configuration of a visual inspection device according to a first example.

Hereinafter, an embodiment of the present invention will be described with reference to the drawings. The embodiment described below does not limit the invention according to the claims, and not all of elements and combinations thereof described in the embodiment are indispensable for means for solving the invention.

In the drawing for illustrating the embodiment, the same reference numerals are given to the parts having the same function, and the repeated description thereof will be omitted.

Further, in the following description, an expression such as "xxx data" may be used as an example of information, but the data structure of the information may be any. That is, the "xxx data" can be referred to as an "xxx table" to show that the information does not depend on the data structure. Further, the "xxx data" may be simply referred to as "xxx". In the following description, the configuration of each information is an example, and the information may be divided and held, or may be combined and held.

In the following description, the process may be described with "program" as the subject. The program is executed by a processor (for example, a central processing unit (CPU)) to perform a predetermined process while appropriately using a storage resource (for example, a memory) and/or a communication interface device (for example, a port). Thus, the subject of the process may be a program. The process described with the program as the subject may be a process performed by a processor or a computer having the processor.

In the following description, when the action subject is described as "oo portion is", this means that the processor reads a processing content of the oo portion, which is a program, from a memory, loads it into the memory, and then realizes the function (details will be described below) of the oo portion.

As described above, there are some parts of non-defective products that are correctly determined as non-defects and some parts that are erroneously determined as defects. Among the non-defective products, a part that is correctly determined as a non-defect is referred to as a normal portion, and among the non-defective products, a part that is erroneously determined as a defect is determined as an overdetection portion. In addition, there are some parts of defective products that are erroneously determined as non-defects and some parts that are correctly determined as defects. Among the defective products, a part that is erroneously determined as a non-defect is referred to as an overlooked portion, and among the defective products, a part that is correctly determined as a defect is determined as an abnormal portion.

A visual inspection device and a visual inspection method of the present embodiment have the following configurations as an example.

(1) The present invention is characterized in that it is provided with an image acquisition portion for acquiring an inspection image of a target object, a pass/fail determination portion for inputting the inspection image acquired in the image acquisition portion and determining whether the inspection image is a non-defect candidate or a defect candidate, an overdetection determination portion for inputting the inspection image determined as a defect candidate in the pass/fail determination portion of the inspection images acquired in the image acquisition portion and determining whether the inspection image is overdetected or non-overdetected (not overdetected), a non-defect estimation parameter learning portion for learning a non-defect estimation parameter used in the pass/fail determination portion using a learning non-defect image acquired in the image acquisition portion, and an overdetection determination parameter learning portion for learning an overdetection determination parameter used in the overdetection determination portion using the learning non-defect image acquired in the image acquisition portion, where the overdetection determination parameter learning portion learns the overdetection determination parameter so as to input the learning non-defect images to the pass/fail determination portion, divide the learning non-defect images into the non-defect candidates and the defect candidates, and determine the non-defect candidate as non-overdetection and the defect candidate as overdetection.

This characteristic is supplemented. What is detected as a defect by a general visual inspection method is an overdetection portion in a non-defective product or an abnormal portion in a defective product. Therefore, when it is possible to determine whether the part detected as a defect by the general visual inspection method is overdetected or non-overdetected (non-overdetection), by making a part determined to be non-overdetected a defect, only the defective portion can be detected, and thus reduction of overdetection can be expected.

The subject of this process is how to learn the overdetection determination parameter used in the overdetection determination portion. When the overdetection determination parameter is learned using an image of the overdetection portion and an image of the abnormal portion, it is possible to determine an appropriate boundary for separating the distribution of the overdetection portion and the distribution of the abnormal portion in the feature amount space. However, it is not desirable because it is necessary to collect images of defective products for learning. Further, it is difficult to determine an appropriate boundary for separating the distribution of the overdetection portion and the distribution of a portion other than the overdetection portion only from the image of the overdetection portion.

Therefore, in the present embodiment, by determining the boundary that separates the overdetection portion and the portion other than the overdetection portion using the image of the overdetection portion and the image of the normal portion, the boundary that is also applicable to the separation of the overdetection portion and the abnormal portion is determined.

FIG. 15 illustrates a schematic diagram of the distribution of the normal portion, the overdetection portion, and the abnormal portion. In FIG. 15, distribution 1301 of the normal portion, distribution 1302 of the overdetection portion, and distribution 1303 of the abnormal portion are illustrated as a two-dimensional distribution, that is, on the feature amount plane. In the present embodiment, boundary 1304 for separating the overdetection portion and the portion other than the overdetection portion is determined by using the image of the overdetection portion and the image of the normal portion. Specifically, in the present embodiment, images of non-defective products for learning are input to the pass/fail determination portion and the images of non-defective products for learning are divided into non-defect candidates and defect candidates, and then the overdetection determination parameter is learned so that the non-defect candidate is determined to be non-overdetected and the defect candidate is determined to be overdetected. FIG. 15 (and FIG. 16 described below) illustrates the distribution 1301 and the like of the normal portion on the feature amount plane, but this is merely a premise for facilitating understanding, and there is no problem in treating it as a multidimensional distribution of three or more dimensions.

(2) The present invention is characterized in that, in the overdetection determination parameter learning portion, a defect candidate image cutting portion in which the learning non-defect image is input to the pass/fail determination portion and the part determined as a defect candidate is set as a defect candidate image, a first image acquisition portion which selects a first image from the defect candidate images, and a second image acquisition portion which sets an region other than the first image from the learning non-defect image as a second image are provided, and the overdetection determination parameter is learned so that the first image is determined as overdetection and the second image is determined as non-overdetection.

This characteristic is supplemented. In general, the overdetection portion is often present in a local region of the image of a non-defective product, and most of the remaining regions are similar in appearance to that of a typical non-defective product. Therefore, when the overdetection determination parameter is learned using the entire image acquired in the image acquisition portion, the overdetection determination accuracy may decrease because the learning is performed including the characteristics of a region other than the overdetection portion.

Therefore, in the present embodiment, by cutting out the part determined as a defect candidate by the pass/fail determination portion, the characteristics of the overdetection portion can be further learned, and thus the accuracy of the overdetection determination can be expected to be improved.

In addition, since there are variations in the appearance of the parts that are determined as defect candidates by the pass/fail determination portion, even when all the images of the parts determined as defect candidates are used for learning the overdetection determination parameter, the characteristics of the overdetection portion cannot be learned, and thus the accuracy of overdetection determination may decrease. Therefore, in the present embodiment, by selecting the first image from the defect candidate images obtained by cutting out the parts determined as defect candidates by the pass/fail determination portion and learning the overdetection determination parameter so that the first image is determined to be overdetected, the characteristics of the overdetection portion can be learned more, and thus improvement in the accuracy of overdetection determination can be expected.

(3) The present invention is characterized in that a normality determination portion which inputs the inspection image determined as a non-defect candidate in the pass/fail determination portion of the inspection images acquired in the image acquisition portion and determines whether the inspection image is normal or not (abnormal), and a normality determination parameter learning portion for learning a normality determination parameter used in the normality determination portion using the learning non-defect image acquired in the image acquisition portion are provided, and the normality determination parameter learning portion inputs the learning non-defect images to the pass/fail determination portion and divides the learning non-defect images into non-defect candidates and defect candidates, and then the normality determination parameter learning portion learns the normality determination parameter so that the non-defect candidates are determined to be normal and the defect candidates are determined to be abnormal.

This characteristic is supplemented. What is determined as a non-defect by a general visual inspection method is the normal portion in the non-defective product or an overlooked portion in a defective product. Therefore, when it is possible to determine whether the part determined as a non-defect by a general visual inspection method is normal or abnormal, by making a part determined to be abnormal a defect, it is possible to detect a defective portion that has been overlooked in the related arts, and thus it is expected that the overlooked defect can be reduced.

The subject of this process is how to learn the normality determination parameter used in the normality determination portion. When the normality determination parameter is learned using the image of the normal portion and the image of the overlooked portion, it is possible to determine an appropriate boundary for separating the distribution of the normal portion and the distribution of the overlooked portion in the feature amount space. However, it is not desirable because it is necessary to collect images of defective products for learning. In addition, it is difficult to determine an appropriate boundary for separating the distribution of the normal portion and the distribution of the portion other than the normal portion only from the image of the normal portion.

Therefore, in the present embodiment, by using the image of the normal portion and the image of the overdetection portion to determine the boundary for separating the normal portion and the portion other than the normal portion, the boundary which is also applicable to the separation between the normal portion and the overlooked portion is determined.

FIG. 16 illustrates a schematic diagram of the distribution of the normal portion, the overdetection portion, and the overlooked portion. FIG. 16 illustrates distribution 1401 of the normal portion, distribution 1402 of the overdetection portion, and distribution 1403 of the overlooked portion as a two-dimensional distribution. In the present embodiment, a boundary 1404 for separating the normal portion and the portion other than the normal portion is determined by using the image of the normal portion and the image of the overdetection portion. Specifically, in the present embodiment, the images of non-defective products for learning are input to the pass/fail determination portion and divided into non-defect candidates and defect candidates, and then the normality determination parameter is learned so that the non-defect candidates are determined to be normal and the defect candidates are determined to be abnormal.

According to the present embodiment, in automating visual inspection using machine learning, when learning using only images of non-defective products, it is possible to reduce overdetection of non-defective portions having a significantly different appearance from those of typical non-defective products, and to reduce overlooking of defective portions having similar appearances to those of non-defective products. This makes it possible to inspect whether the inspection target object is a non-defective product or a defective product with high accuracy.

First Example

1. Schematic Configuration of Visual Inspection Device

FIG. 1 is a diagram illustrating a schematic configuration of a visual inspection device according to a first example.

A visual inspection device 10 is a device capable of various information processing, for example, an information processing device such as a computer. The visual inspection device 10 has a processor 11 and a memory 12.

The processor 11 is, for example, a central processing unit (CPU), a graphics processing unit (GPU), an field-programmable gate array (FPGA), or the like. The memory 12 includes, for example, a magnetic storage medium such as a hard disk drive (HDD), a semiconductor storage medium such as a random access memory (RAM), a read only memory (ROM), and a solid state drive (SSD), and the like. A combination of an optical disk such as a digital versatile disk (DVD) and an optical disk drive is also used as the memory. In addition, known storage media such as magnetic tape media are also used as the memory.

A program such as firmware is stored in the memory 12. When the action of the visual inspection device 10 starts (for example, when the power is turned on), a program such as firmware is read from the memory 12 and executed to perform overall control of the visual inspection device 10. In addition to the program, the memory 12 stores data and the like required for each process of the visual inspection device 10.

Imaging means 13, input means 14, and display means 15 are connected to the visual inspection device 10.

The imaging means 13 is, for example, a CCD camera, an optical microscope, a charged particle microscope, an ultrasonic inspection device, an X-ray inspection device, or the like. The imaging means 13 outputs an inspection image to the visual inspection device 10 by capturing the surface or the inside of an inspection target object as a digital image. The input means 14 is, for example, a keyboard, a mouse, or the like, and outputs an operation input signal to the visual inspection device 10 based on an operation by an inspector of the visual inspection device 10. The display means 15 is, for example, a display or the like, and displays a predetermined screen based on a display control signal transmitted from the visual inspection device 10.

The visual inspection device 10 of this example may be configured by a so-called cloud in which a plurality of information processing devices can communicate with each other via a communication network.

The processor 11 of the visual inspection device 10 has an image acquisition portion 20, a non-defect estimation parameter learning portion 21, an overdetection determination parameter learning portion 22, a pass/fail determination portion 23, and an overdetection determination portion 24 as function realization portions. The overdetection determination parameter learning portion 22 has a defect candidate image cutting portion 22a, a first image acquisition portion 22b, and a second image acquisition portion 22c.

Further, a non-defect estimation parameter 30 and an overdetection determination parameter 31 are stored in the memory 12 of the visual inspection device 10. The non-defect estimation parameter 30 has an initial non-defect estimation parameter 30a and a final non-defect estimation parameter 30b.

The details of each of the function realization portions provided in the processor 11 and the parameters stored in the memory 12 will be described below.

2. Entire Processing Sequence of Visual Inspection Device

Figure 2:
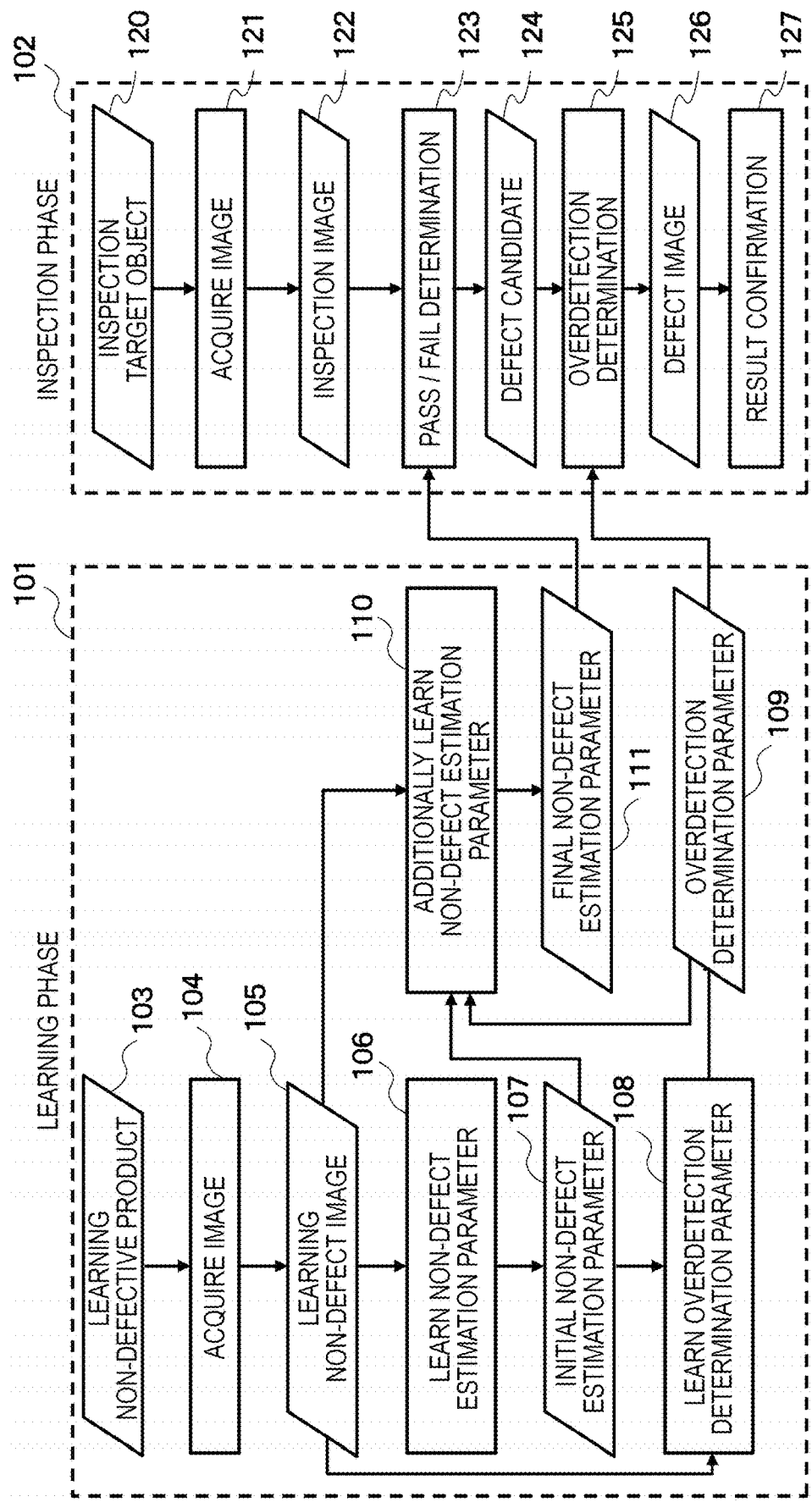
FIG. 2 is a diagram illustrating an example of an overall processing sequence of the visual inspection device according to the first example.

The entire processing sequence of the visual inspection device 10 in this example is illustrated in FIG. 2. The processing sequence is roughly divided into a learning phase 101 and an inspection phase 102.

In the learning phase 101, the image acquisition portion acquires a learning non-defect image 105 obtained by imaging a non-defective product 103 for learning (104). The learning non-defect image is acquired by capturing the surface or the inside of a non-defective product for learning as a digital image with the imaging means 13.

As another example of "acquisition", an image captured by another system may be simply received and stored in the memory 12 of the visual inspection device 10.

Next, in the non-defect estimation parameter learning portion, the non-defect estimation parameter used in the pass/fail determination portion (details will be described below in FIG. 4) is learned using the learning non-defect image 105, and the initial non-defect estimation parameter 107 is obtained (106).

Figure 3:
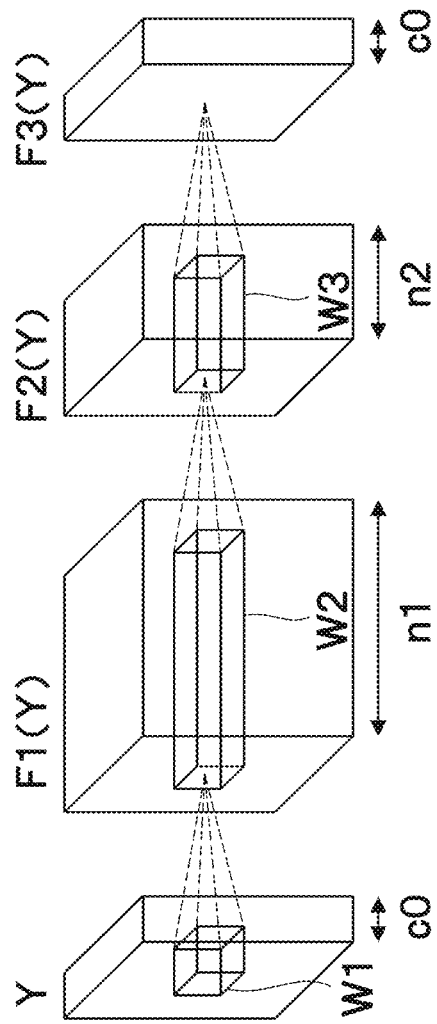
FIG. 3 is a diagram illustrating an example of a neural network configuration of a non-defective product estimator used in the visual inspection device according to the first example.

The non-defect estimation parameter is an internal parameter of a non-defective product estimator based on machine learning that outputs a pseudo non-defect image for difference calculation by inputting an image captured by the image acquisition portion. As the non-defective product estimator, various existing machine learning engines can be used, and examples thereof include a neural network as illustrated in FIG. 3 described below.

Figure 5:
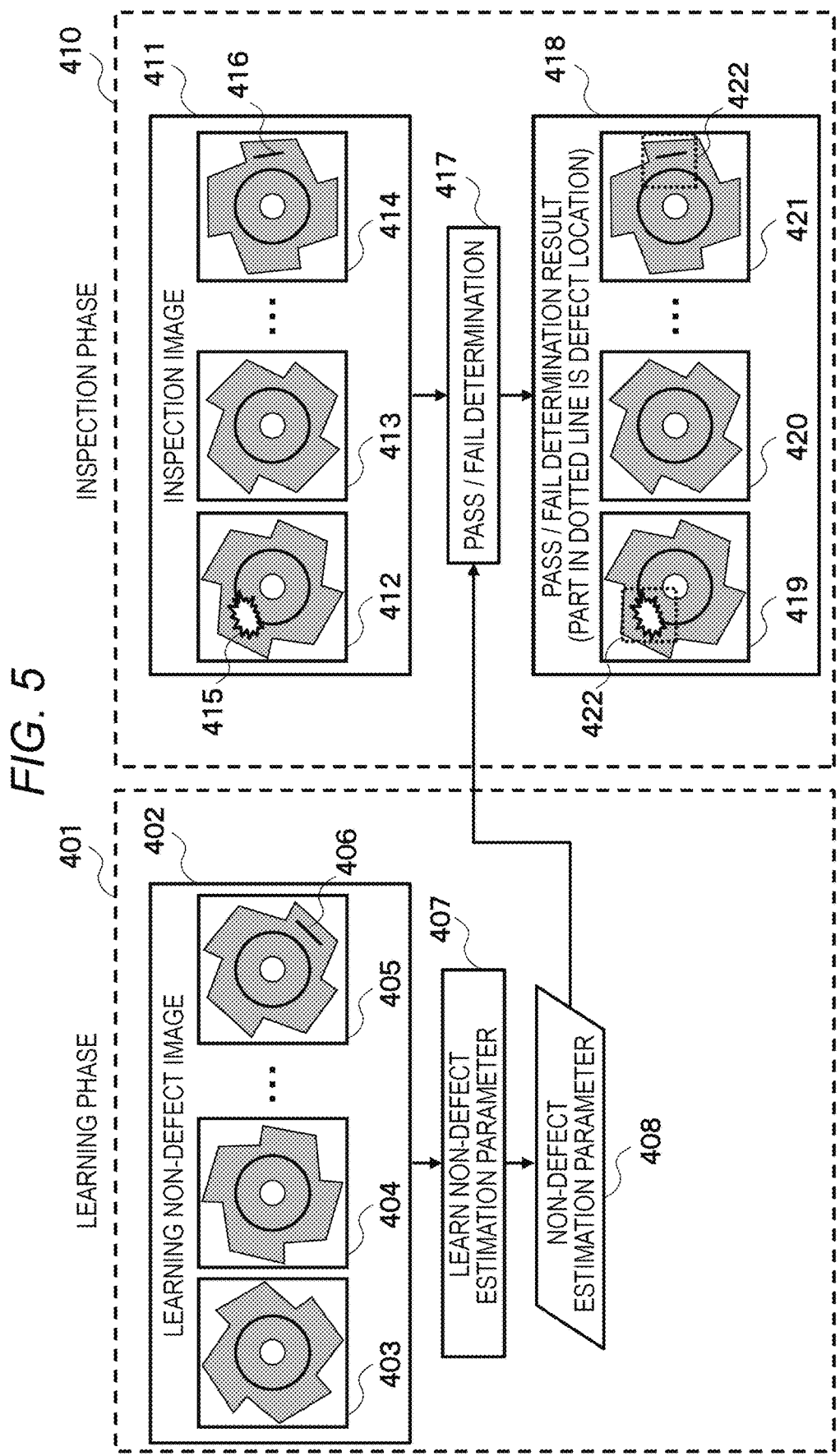
FIG. 5 is a diagram illustrating an example of a general visual inspection method by learning using only non-defect images.

In general, the image (inspection image) of the inspection target object acquired by the image acquisition portion is input to the non-defective product estimator, and the output pseudo non-defect image and the inspection image are compared and inspected, so that a part having a large difference is determined as a defect. However, as illustrated in FIG. 5 described below, since non-defective products for learning also have variations in brightness and shape, a non-defective portion whose appearance is significantly different from that of a typical non-defective product is often detected (over-detected) as a defect.

In this example, in the overdetection determination parameter learning portion, the learning non-defect images are input to the pass/fail determination portion and the input images are divided into non-defect candidate inspection images (hereinafter, simply referred to as "non-defect candidates") and defect candidate inspection images (hereinafter, simply referred to as "defect candidates") by using the initial non-defect estimation parameter 107, and then an overdetection determination parameter 109 used in the overdetection determination portion is learned so that non-defect candidates are determined as non-overdetection (non-overdetected) inspection images (hereinafter, simply referred to as "non-overdetection") and defect candidates are determined as overdetection inspection images (hereafter, simply referred to as "overdetection") (108).

The overdetection determination parameter is an internal parameter of the overdetection discriminator based on machine learning that determines whether it is overdetection or non-overdetection by inputting the image determined as a defect candidate by a pass/fail determination process from the images captured by the image acquisition portion. As the overdetection discriminator, various existing machine learning engines can be used, and for example, a deep neural network represented by a Convolutional Neural Network (CNN), a Support Vector Machine (SVM)/Support Vector Regress (SVR), a k-nearest neighbor (k-NN), and the like can be exemplified. These engines can handle classification problems.

Further, in this example, in the non-defect estimation parameter learning portion, the learning non-defect images are divided into non-defect candidates and defect candidates by the pass/fail determination process, and the non-defect candidate which is determined to be overdetected as a result of inputting the non-defect candidates to the overdetection determination portion and the defect candidate which is determined to be non-overdetected as a result of inputting the defect candidate to the overdetection determination portion are used to additionally learn a non-defect estimation parameter, in such a manner that a final non-defect estimation parameter 111 is obtained (110). Details of the additional learning of the non-defect estimation parameter will be described with reference to FIG. 11 described below. The initial non-defect estimation parameter 107 may be set to the final non-defect estimation parameter 111 without performing the additional learning.

In the inspection phase 102, an inspection image 122 obtained by imaging an inspection target object 120 is acquired in the image acquisition portion (121). The inspection image 122 is acquired by capturing the surface or the inside of the inspection target object 120 as a digital image by the imaging means 13.

Figure 4:
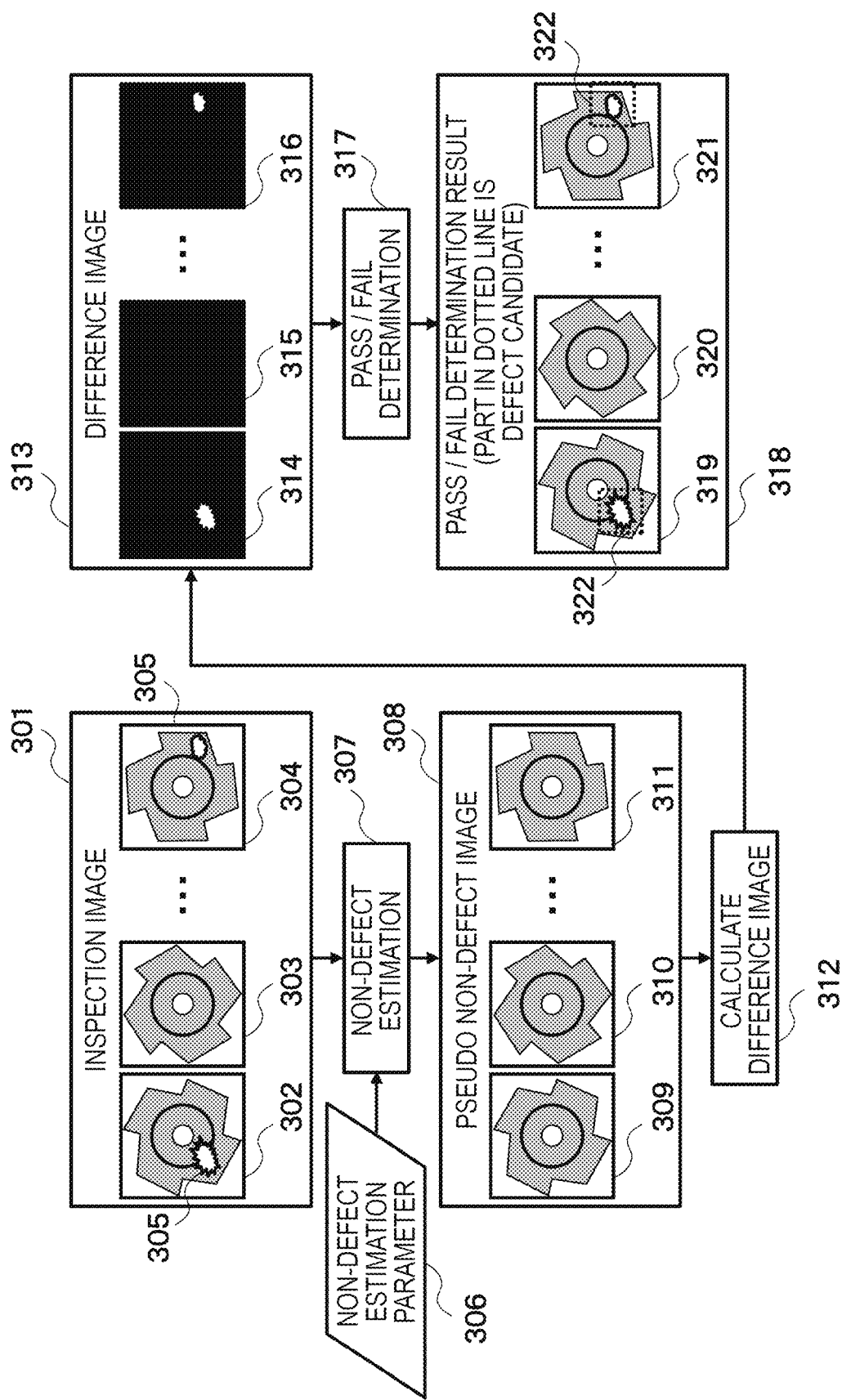
FIG. 4 is a diagram illustrating a pass/fail determination method for determining whether an inspection image by the visual inspection device according to the first example is a non-defect candidate or a defect candidate.

Next, as illustrated in FIG. 4, which will be described below, the inspection image is input to the pass/fail determination portion, and the image is determined whether it is a non-defect candidate or a defect candidate by using the final non-defect estimation parameter 111 (123). Next, among the inspection images, an inspection image 124 determined as a defect candidate in 123 is input to the overdetection determination portion, and it is determined whether the inspection image is overdetection or non-overdetection, and then the inspection image determined to be non-overdetected is output as a defect image 126 (125). The defect image 126 is confirmed by an inspector (127), and when there is a defect or the like, the countermeasure is fed back to a manufacturing process.

3. Non-Defective Product Estimator

As a non-defective product estimator which estimates a pseudo non-defect image from an input image in this example, for example, a convolutional neural network described in Document (Dong, Chao, et al. "Image super-resolution using deep convolutional networks." arXiv preprint arXiv: 1501.00092 (2014)) may be used.

Specifically, a neural network having a three-layer structure as illustrated in FIG. 3 may be used. Here, Y indicates an input image, $F1(Y)$ and $F2(Y)$ indicate intermediate data, and $F(Y)$ is an estimation result of a pseudo non-defect image.

The intermediate data and the estimation result are calculated by the following equations (1) to (3). However, "*" represents a convolution operation. Here, W1 is a filter having a size of $c0 \times f1 \times f1$ whose the number is n1, where c0 represents the number of channels of the input image and f1 represents the size of a spatial filter. By convolving the $c0 \times f1 \times f1$ size filter n1 times in the input image, an n1 dimensional feature map can be obtained. B1 is an n1 dimensional vector and is a bias component corresponding to the filter whose the number is n1. Similarly, W2 is a filter having a size of $n1 \times f2 \times f2$ whose the number is n2, and B2 is an n2 dimensional vector. Also, W3 is a filter having a size of $n2 \times f3 \times f3$ whose the number is c0, and B3 is a c0 dimensional vector.

$$F1(Y) = \max(0, W1*Y+B1) \quad (1)$$

$$F2(Y) = \max(0, W2*F1(Y)+B2) \quad (2)$$

$$F(Y) = W3*F2(Y)+B3 \quad (3)$$

The above-mentioned c0 is a value determined by the number of channels of the input image. Further, f1 and f2, n1 and n2 are hyperparameters determined by a user before the learning sequence, and for example, $f1=9$, $f2=5$, $n1=128$, and $n2=64$ may be set. The parameters to be adjusted in the non-defect estimation parameter learning portion are W1, W2, W3, B1, B2, and B3.

In learning the non-defect estimation parameters, by inputting the learning non-defect image into the non-defective product estimator, the pseudo non-defect image is estimated and the estimation error between the learning non-defect image and the pseudo non-defect image is calculated, and then the non-defect estimation parameter is updated so as to reduce the estimation error. Learning is performed by repeating this process for a predetermined number of times N1 of learnings of non-defect estimation parameters.

Even when the number of repetitions is less than N1, the learning may be finished when the estimation error is small or when an operation of finishing the learning is received from a user such as an inspector.

In updating the non-defect estimation parameter, error backpropagation, which is common in neural network learning, may be used. Further, when calculating the estimation error, all of the learning non-defect images may be used, but a mini-batch method may be adopted. That is, several images may be randomly extracted from the learning non-defect image, and the non-defect estimation parameter may be updated repeatedly.

Further, a patch image may be randomly cut out from the learning non-defect image and used as the input image Y of the neural network. As a result, learning can be performed efficiently.

In addition, another configuration may be used as the configuration of the convolutional neural network described above. For example, the number of layers may be changed, a network having four or more layers may be used, or a configuration having a skip connection may be used.

4. Pass/Fail Determination

FIG. 4 illustrates a method of determining whether the inspection image is a non-defect candidate or a defect candidate by using the pass/fail determination portion in this example. First, a pseudo non-defect image 308 is estimated from an inspection image 301 using a non-defect estimation parameter 306 learned in the non-defect estimation parameter learning portion (307). In FIG. 4, as an example, three inspection images 302, 303, and 304 and a defect 305 are illustrated. Further, pseudo non-defect images 309, 310, and 311 estimated from the inspection images 302, 303, and 304, respectively, are illustrated in FIG. 4.

Next, a difference image 313 between the inspection image 301 and the pseudo non-defect image 308 is calculated (312). FIG. 4 illustrates difference images 314, 315, and 316 corresponding to the inspection images 302, 303, and 304, respectively. Next, with the difference image 313 as an input, a part where a pixel value of the difference image is smaller than a predetermined pass/fail determination threshold value TH is regarded as a non-defect candidate, and a part where the pixel value of the difference image is larger than TH is regarded as a defect candidate, and then a pass/fail determination result 318 is output (317). FIG. 4 illustrates pass/fail determination results 319, 320, and 321 corresponding to the inspection images 302, 303, and 304, respectively, and a defect candidate 322.

5. Overdetection Determination

5.1 General Problem

As described above, in this example, in the overdetection determination parameter learning portion, the learning non-defect images are input to the pass/fail determination portion to divide them into the non-defect candidates and the defect candidates, and then the overdetection determination parameter is learned so that the non-defect candidates are determined to be non-overdetected and the defect candidates are determined to be overdetected.

A general problem is that, since there are variations in brightness and shape among non-defective products, it is often the case that a non-defective portion having a significantly different appearance from that of a typical non-defective product is determined (over-detected) as a defect. FIG. 5 illustrates a general visual inspection method by learning using only non-defect images.

In a learning phase 401, first, a non-defect estimation parameter 408 is learned by using a learning non-defect image 402 (407). FIG. 5 illustrates three learning non-defect images 403, 404, and 405 and an overdetection portion 406 as examples.

In an inspection phase 410, as described with reference to FIG. 4, the non-defect estimation parameter 408 is used to perform a pass/fail determination on an inspection image 411, and a pass/fail determination result 418 is obtained (417). In FIG. 5, as an example, three inspection images 412, 413, and 414, a defect 415, and an overdetection portion 416 are illustrated. Further, FIG. 5 illustrates pass/fail determination results 419, 420, and 421 corresponding to the inspection images 412, 413, and 414, respectively and a defective part 422. As illustrated in FIG. 5, the overdetection portion 416 is overdetected. This occurs because the characteristics of the overdetection portion cannot be sufficiently learned when the number of learning non-defect images having an overdetection portion is small.

What is determined as a defect by the method described with reference to FIG. 5 is an overdetection portion in a non-defective product or an abnormal portion in a defective product. Therefore, when it is possible to determine whether the part determined as a defect by the method described with reference to FIG. 5 is overdetected or non-overdetected, only a defective portion can be detected by defining the part determined to be non-overdetected as a defect, and thus it is possible to reduce overdetection.

In this example, in the learning phase, the learning non-defect images are input to the pass/fail determination portion to divide them into non-defect candidates and defect candidates, and then the overdetection determination parameter is learned so that the non-defect candidates are determined to be non-overdetected and the defect candidates are determined to be overdetected. In the inspection phase, the inspection images are input to the pass/fail determination portion to determine whether it is a non-defect candidate or a defect candidate, and the inspection images determined as the defect candidates are input to the overdetection determination portion to determine whether it is overdetected or non-overdetected, and then the inspection image determined to be non-overdetected is output as a defect image. There are several examples of the learning method of the overdetection determination parameter in the learning phase of this example. Hereinafter, a typical example will be specifically described.

5.2 Learning Method of Overdetection Determination Parameter 1

An example of the learning method of the overdetection determination parameter in this example will be described with reference to FIG. 6.

Figure 6:
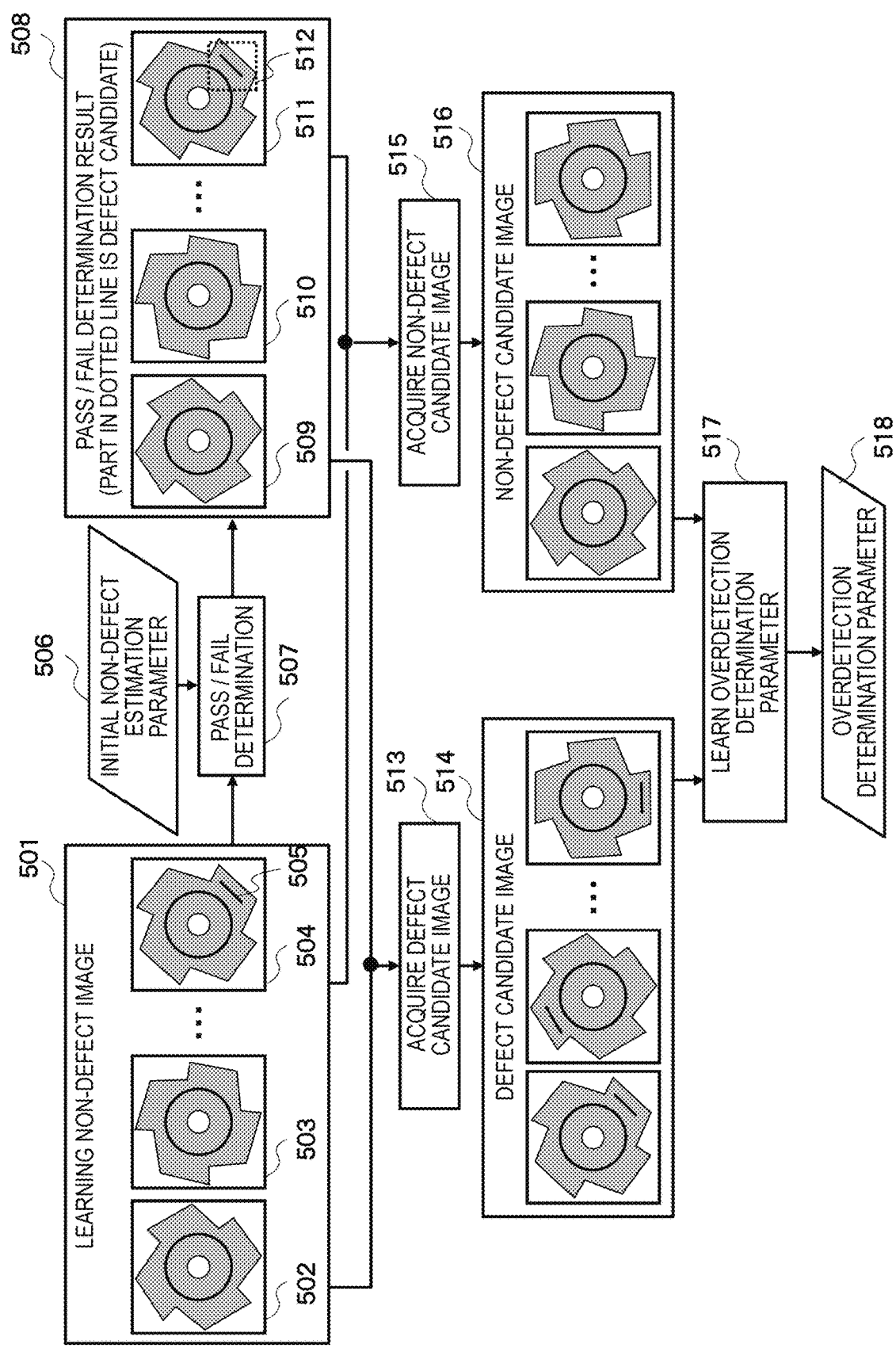
FIG. 6 is a diagram illustrating an example of a learning method of an overdetection determination parameter by the visual inspection device according to the first example.

In the example illustrated in FIG. 6, first, a pass/fail determination is performed on a learning non-defect image 501 using an initial non-defect estimation parameter 506, and a pass/fail determination result 508 is obtained (507). In FIG. 6, as an example, three learning non-defect images 502, 503, and 504 and an overdetection portion 505 are illustrated. Further, FIG. 6 illustrates pass/fail determination results 509, 510, and 511 corresponding to the learning non-defect images 502, 503, and 504, respectively, and a defect candidate 512.

Next, among the learning non-defect images 501, an image having a part determined as a defect candidate by pass/fail determination is referred to as a defect candidate image 514 (513). Next, among the learning non-defect images 501, an image (image in which the entire region of the image is determined as a non-defect candidate) in which no part is determined as a defect candidate by pass/fail determination is defined as a non-defect candidate image 516 (515). Next, an overdetection determination parameter 518 is learned so as to determine the defect candidate image 514 as overdetection and the non-defect candidate image 516 as non-overdetection (517).

In learning the overdetection determination parameter, by inputting the defect candidate images and the non-defect candidate images into the overdetection discriminator, it is determined whether the image is overdetected or non-overdetected, and based on the determination result, the determination error is calculated, and then the overdetection determination parameter is updated so that the determination error becomes smaller. Learning is performed by repeating this process for a predetermined number of times N2 of learnings of overdetection determination parameter.

The determination error is calculated by the equation (4). In the equation (4), t_i is the correct label of an image i (i=1, 2, . . . , N, N: number of learning non-defect images), and y_i is the label representing the determination result of the image i. For example, the over-detection label may be 1 and the non-overdetection label may be 0. Even when the number of repetitions is less than N2, the learning may be finished when the determination error is small or when the operation of finishing the learning is received from a user such as an inspector.

$$L=\{\Sigma(t\_i-y\_i)^2\}/N \quad (4)$$

5.3 Learning Method of Overdetection Determination Parameter 2

An example of the learning method of the overdetection determination parameter different from the example described in 5.2 in this example will be described with reference to FIG. 7.

Figure 7:
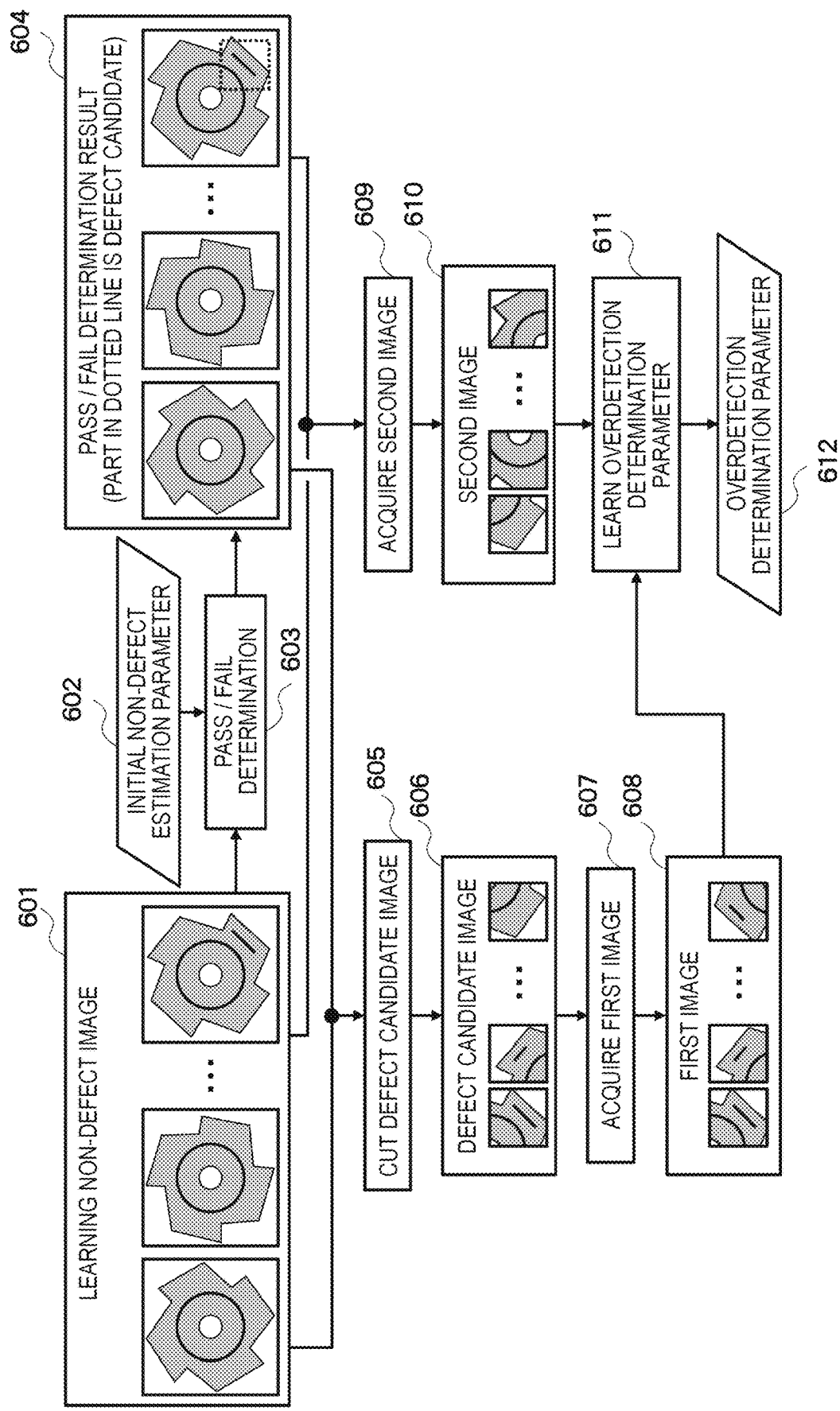
FIG. 7 is a diagram illustrating an example of a learning method of an overdetection determination parameter by the visual inspection device according to the first example.

In the example illustrated in FIG. 7, first, as in the method described in 5.2, an initial non-defect estimation parameter 602 is used to perform the pass/fail determination of the learning non-defect image 601, and the pass/fail determination result 604 is obtained (603).

Figure 10:
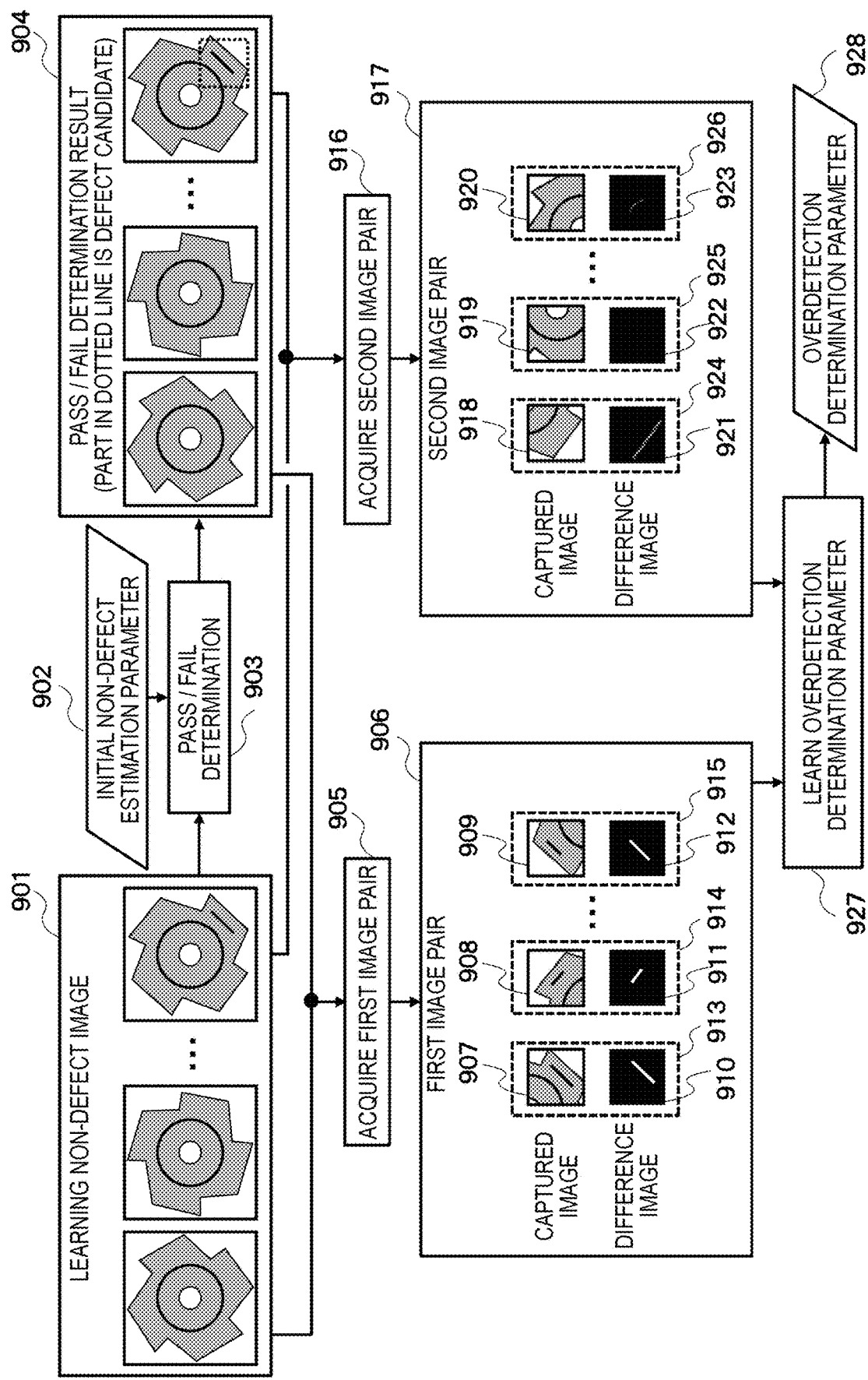
FIG. 10 is a diagram illustrating an example of a learning method of an overdetection determination parameter by the visual inspection device according to the first example.

Next, a part determined as a defect candidate by the pass/fail determination is cut out as a defect candidate image 606 by using a defect candidate image cutting portion (605), and the defect candidate image 606 is displayed on the GUI by using a first image acquisition portion as illustrated in FIG. 10 described below, and the inspector selects a first image 608 from the defect candidate image 606 (607), and then a part other than the first image 608 is cut out from the learning non-defect image 601 as a second image 610 by using a second image acquisition portion (609), and an overdetection determination parameter 612 is learned so that the first image 608 is determined to be overdetected and the second image 610 is determined to be non-overdetected (611).

Therefore, in the example illustrated in FIG. 7, by cutting out the part determined as a defect candidate by the pass/fail determination portion, the characteristics of the overdetection portion can be further learned, and the accuracy of the overdetection determination can be expected to be improved.

5.4 Learning Method of Overdetection Determination Parameter 3

An example of the learning method of the overdetection determination parameter different from the examples described in 5.2 to 5.3 in this example will be described with reference to FIG. 8.

Figure 8:
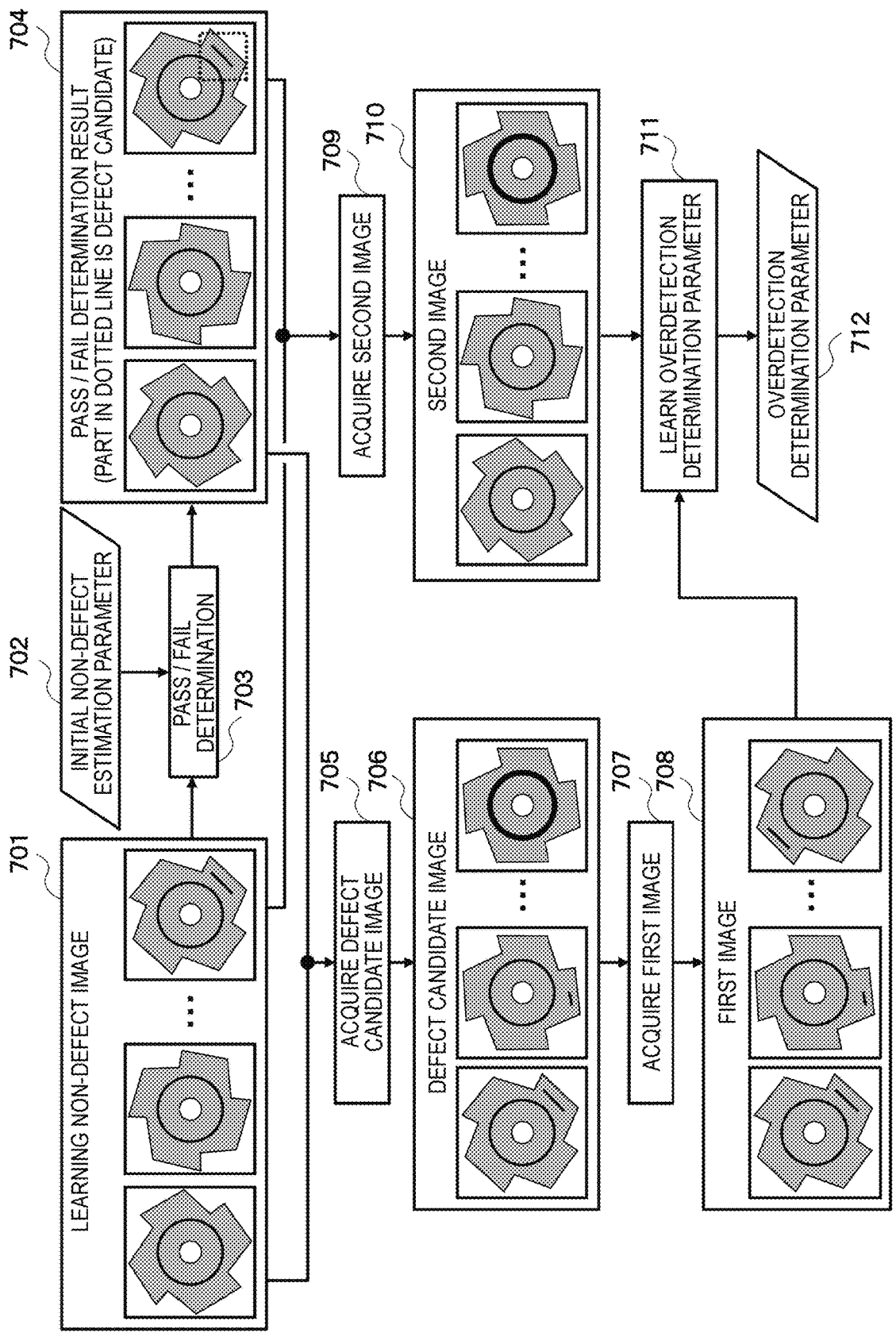
FIG. 8 is a diagram illustrating an example of a learning method of an overdetection determination parameter by the visual inspection device according to the first example.

In the example illustrated in FIG. 8, first, as in the method described in 5.2, an initial non-defect estimation parameter 702 is used to perform the pass/fail determination of a learning non-defect image 701, and a pass/fail determination result 704 is obtained (703).

Next, among learning non-defect images 701, the image having a part determined as a defect candidate by the pass/fail determination is designated as a defect candidate image 706 (705), and the defect candidate image 706 is displayed in the GUI and the inspector selects a first image 708 from the defect candidate image 706 (707) by using the first image acquisition portion, and then, from the learning non-defect images 701, the images other than the first image 708 are designated as second images 710 (709) by using the second image acquisition portion, and the overdetection determination parameter 612 is learned so that the first image 708 is determined to be overdetected and the second image 710 is determined to be non-overdetected (711).

Therefore, in the example illustrated in FIG. 8, by acquiring the defect candidate images determined as the defect candidates by the pass/fail determination portion and selecting the first image from these defect candidate images, the characteristics of the overdetection portion can be further learned. As a result, it is expected that the accuracy of overdetection determination will be improved.

5.5 Learning Method of Overdetection Determination Parameter 4

An example of the learning method of the overdetection determination parameter different from the examples described in 5.2 to 5.4 in this example will be described with reference to FIG. 9.

Figure 9:
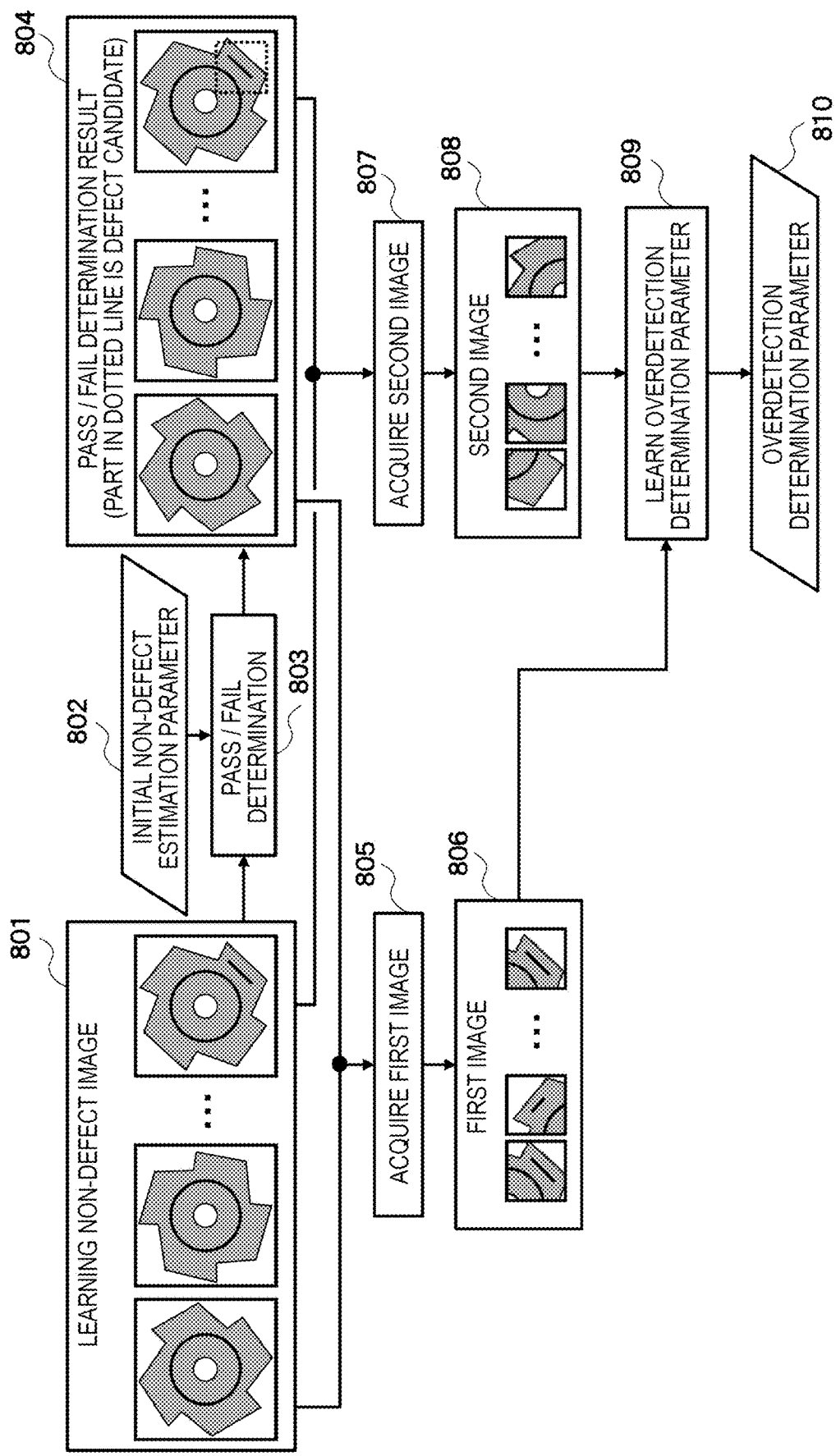
FIG. 9 is a diagram illustrating an example of a learning method of an overdetection determination parameter by the visual inspection device according to the first example.

In the example illustrated in FIG. 9, first, as in the method described in 5.2, an initial non-defect estimation parameter 802 is used to perform the pass/fail determination of a learning non-defect image 801, and a pass/fail determination result 804 is obtained (803).

Next, a part determined as a defect candidate by the pass/fail determination is cut out as a first image 806 from the learning non-defect image 801 by using a first image acquisition portion (805), and a part (a part determined as the non-defect candidate by the pass/fail determination) other than the first image 806 is cut out as a second image 808 from the learning non-defect image 801 by using a second image acquisition portion (807), and then an overdetection determination parameter 810 is learned so that the first image 806 is determined to be overdetected and the second image 808 is determined to be non-overdetected (809).

Therefore, in the example illustrated in FIG. 9, the characteristics of the overdetection portion can be further learned by cutting out the part determined as the defect candidate by the pass/fail determination portion as the first image. As a result, it is expected that the accuracy of over-detection determination will be improved.

5.6 Learning Method of Overdetection Determination Parameter 5

An example of the learning method of the overdetection determination parameter different from the examples described in 5.2 to 5.5 in this example will be described with reference to FIG. 10.

In the example illustrated in FIG. 10, first, as in the method described in 5.2, an initial non-defect estimation parameter 902 is used to perform the pass/fail determination of a learning non-defect image 901, and a pass/fail determination result 904 is obtained (903).

Next, regarding the part determined as a defect candidate in the pass/fail determination of the learning non-defect image 901, the learning non-defect image 901 and a difference image calculated at the time of pass/fail determination are cut out, and a pair of the two cut out images is referred to as a first image pair 906 (905). In FIG. 10, as an example, three images 907, 908, and 909 obtained by cutting out defect candidate parts from the learning non-defect images are illustrated. Further, FIG. 10 illustrates difference images 910, 911, and 912 corresponding to the images 907, 908, and 909, respectively, and first image pairs 913, 914, and 915.

Next, regarding the parts (the parts determined as non-defect candidates by the pass/fail determination) other than the first images 906 of the learning non-defect images 901, the learning non-defect images 901 and the difference images calculated at the time of pass/fail determination are cut out, and a pair of the two cut out images is referred to as a second image pair 917 (916). In FIG. 10, as an example, three images 918, 919, and 920 obtained by cutting out the non-defect candidate parts from the learning non-defect images are illustrated. Further, FIG. 10 illustrates difference images 921, 922, and 923 corresponding to the images 918, 919, and 920, respectively, and second image pairs 924, 925, and 926.

Next, an overdetection determination parameter 928 is learned so that the first image pair 906 is determined to be overdetected and the second image pair 917 is determined to be non-overdetected (927).

Therefore, in the example illustrated in FIG. 10, by cutting out the learning non-defect images and the difference images calculated at the time of pass/fail determination for each of the parts determined as non-defect candidates and defect candidates in the pass/fail determination by using the pass/fail determination portion, it is determined that whether the inspection images are non-defect candidates or defect candidates. Therefore, it is possible to reliably determine whether the inspection images are non-defect candidates or defect candidates.

In addition, in the example illustrated in FIG. 10, since the overdetection determination parameter is learned using this difference images and the learning non-defect images, it is possible to learn more about the characteristics of the overdetection portion. As a result, it is expected that the accuracy of overdetection determination will be improved.

5.7 Effect of Overdetection Determination

In the visual inspection device in this example, the overdetection determination parameter is learned by the method described in 5.2 to 5.7 in the learning phase. In the inspection phase, it is the overdetection portion or the defective portion in the non-defective product that is determined as a defect candidate by the pass/fail determination.

Therefore, by using the overdetection determination parameter learned in the learning phase, it is determined whether the part determined as a defect candidate by the pass/fail determination is overdetected or non-overdetected, and the part determined to be non-overdetection is regarded as a defect, in such manner that only defective portions can be detected and overdetection can be reduced.

Therefore, according to this example, it is possible to realize the visual inspection device and the visual inspection method capable of inspecting whether the inspection target object is a non-defective product or a defective product with high accuracy.

6. Additional Learning

A method of additionally learning the non-defect estimation parameter using the non-defect estimation parameter learning portion in this example will be described with reference to FIG. 11.

First, pass/fail determination is performed on learning non-defect images 1001 by using an initial non-defect estimation parameter 1002, and an image (image in which the entire region is determined as a non-defect candidate) in which there is no part determined as the defect candidate is acquired as a non-defect candidate image 1004, and then an image having a part determined as a defect candidate is acquired as a defect candidate image 1005 (1003).

Next, by using an overdetection determination parameter 1006 learned in the overdetection determination parameter learning portion, non-defect candidate images are input to the overdetection determination portion, and an image determined to be overdetected is acquired as an overdetection image 1008 (1007).

Next, by using the overdetection determination parameter 1006 learned in the overdetection determination parameter learning portion, defect candidate images are input to the overdetection determination portion, and an image determined to be non-overdetected is acquired as a non-overdetection image 1010 (1009).

Next, a final non-defect estimation parameter 1012 is obtained by performing additional learning using the overdetection image 1008 and the non-overdetection image 1010 with the initial non-defect estimation parameter as an initial value of the non-defect estimation parameter (1011).

Figure 11:
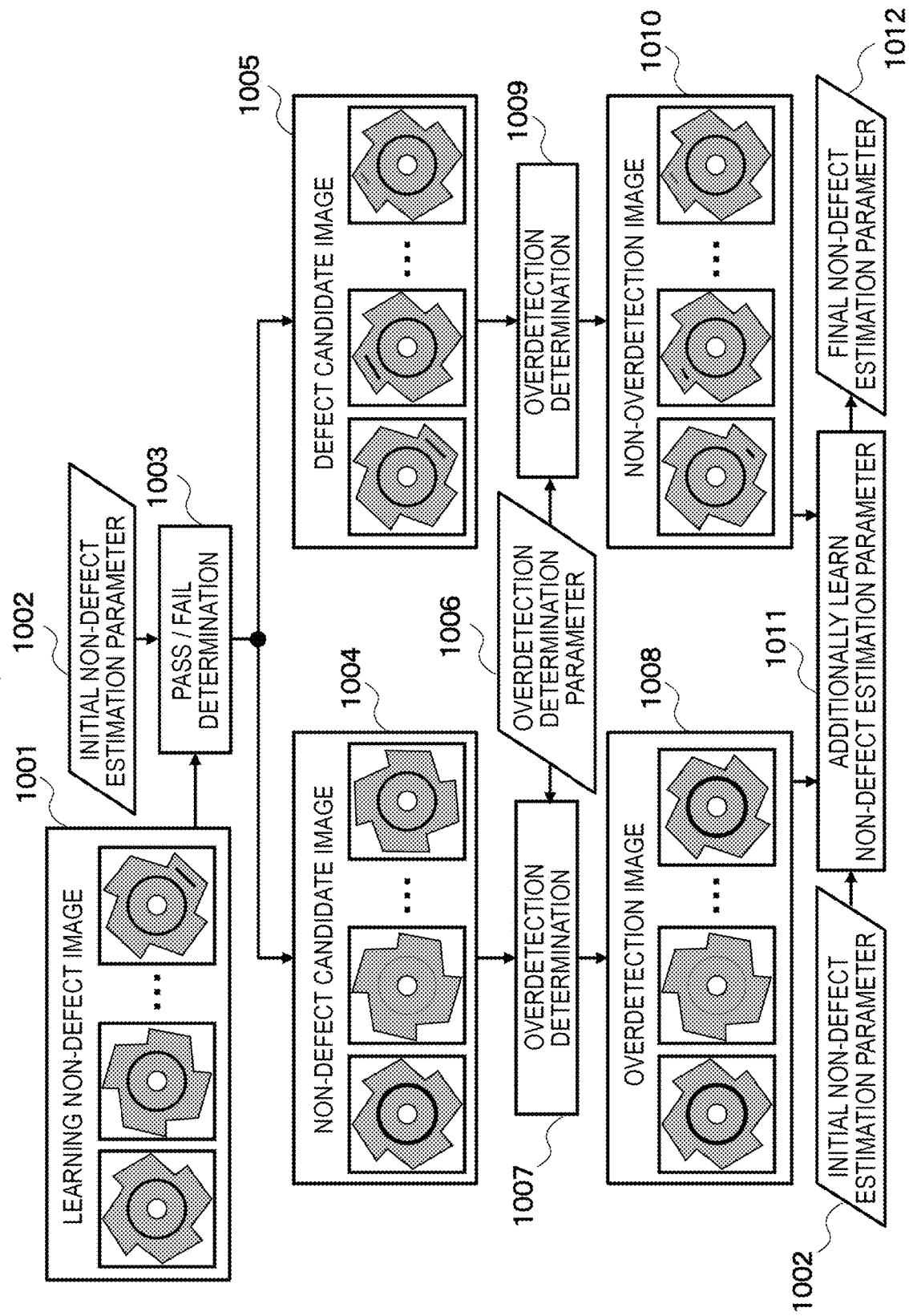
FIG. 11 is a diagram illustrating a method of additionally learning a non-defect estimation parameter by the visual inspection device according to the first example.

Therefore, in an example illustrated in FIG. 11, by performing the additional learning using the overdetection image and the non-overdetection image, the characteristics of the overdetection portion can be further learned, and thus the accuracy of the overdetection determination can be expected to be improved.

Second Example

7. Schematic Configuration of Visual Inspection Device

Figure 12:
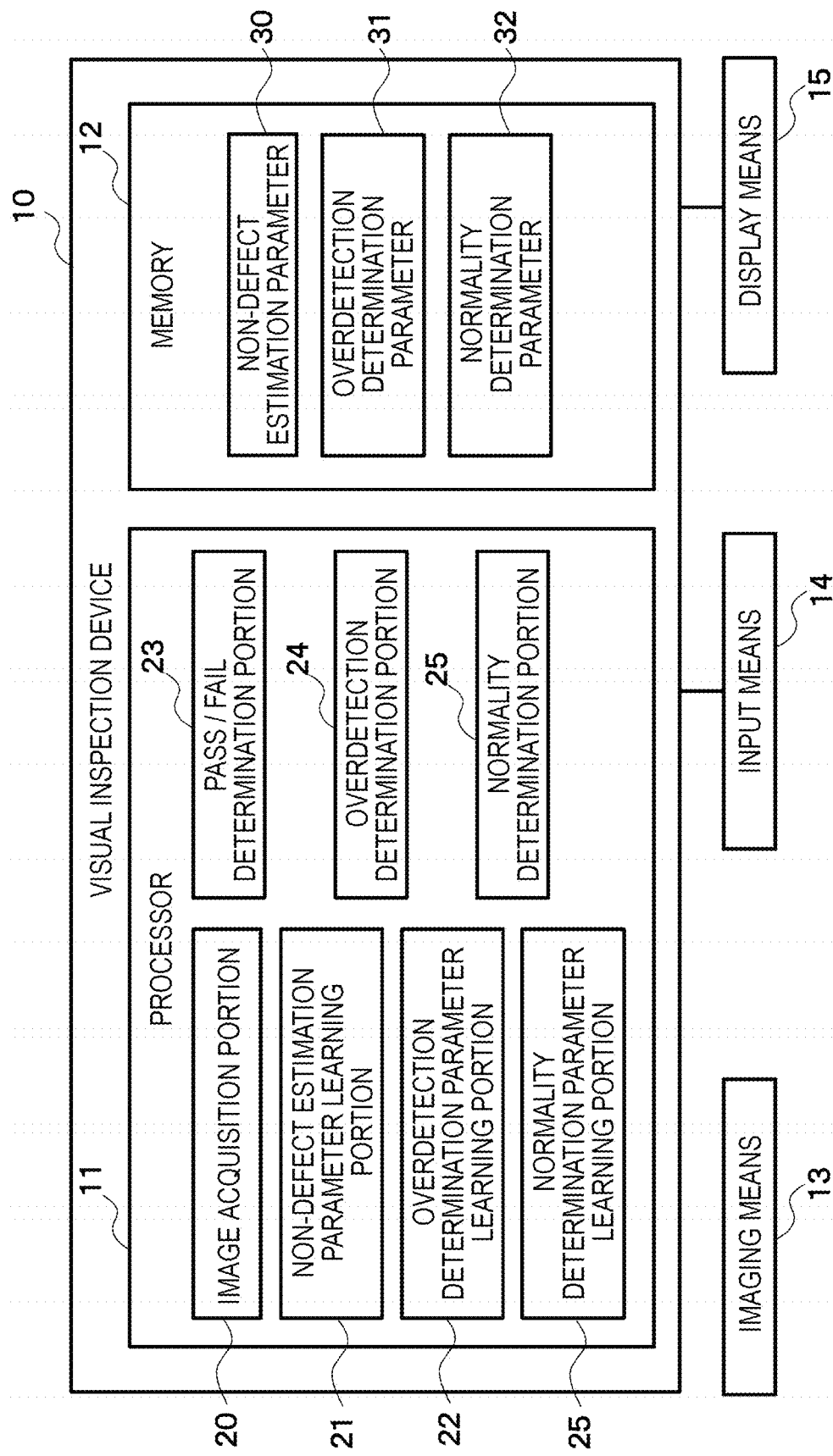
FIG. 12 is a diagram illustrating a schematic configuration of a visual inspection device according to a second example.

FIG. 12 is a diagram illustrating a schematic configuration of a visual inspection device according to a second example. The processor 11 of the visual inspection device 10 includes, as function realization portions, the image acquisition portion 20, the non-defect estimation parameter learning portion 21, the overdetection determination parameter learning portion 22, and a normality determination parameter learning portion 25.

Further, the memory 12 of the visual inspection device 10 stores the non-defect estimation parameter 30, the overdetection determination parameter 31, and a normality determination parameter 32.

8. Normality Determination

As the visual inspection device in this example, a processing sequence different from the processing sequence of FIG. 1 will be described with reference to FIG. 13. The processing sequence is roughly divided into a learning phase 1101 and an inspection phase 1102.

In the learning phase 1101, in the image acquisition portion, a learning non-defective product 1103 is imaged and a learning non-defect image 1105 is acquired (1104). Next, in the non-defect estimation parameter learning portion, the learning non-defect image 1105 is used to learn a non-defect estimation parameter 1107 used in the pass/fail determination portion (1106: the same as 106 in FIG. 1).

Next, in the overdetection determination parameter learning portion, the learning non-defect images 1106 are input to the pass/fail determination portion and are divided into non-defect candidates and defect candidates by using the non-defect estimation parameter 1107, and then a overdetection determination parameter 1109 used in the overdetection determination portion is learned so that the non-defect candidate is determined to be non-overdetected and the defect candidate is determined to be overdetected (1108: the same as 108 in FIG. 1).

Next, in the normality determination parameter learning portion, the learning non-defect images 1106 are input to the pass/fail determination portion and are divided into non-defect candidates and defect candidates by using the non-defect estimation parameter 1107, and then a normality determination parameter 1111 used in the normality determination portion is learned so that the non-defect candidate is determined to be normal and the defect candidate is determined to be abnormal (non-normal) (1110).

The normality determination parameter is an internal parameter of a normality discriminator based on machine learning that determines whether it is normal or abnormal by inputting an image determined as a non-defect candidate by the pass/fail determination process from the images captured by the image acquisition portion. As the normality discriminator, as similar to the overdetection discriminator, various existing machine learning engines can be used, and for example, a deep neural network represented by a Convolutional Neural Network (CNN), a Support Vector Machine (SVM)/Support Vector Regress (SVR), a k-nearest neighbor (k-NN), and the like can be exemplified. These engines can handle classification problems.

In the inspection phase 1102, an inspection target object 1112 is imaged and an inspection image 1114 is acquired in the image acquisition portion (1113: the same as 121 in FIG. 1). Next, the inspection images are input to the pass/fail determination portion, and the inspection images are divided into non-defect candidates 1118 and defect candidates 1116 by using the non-defect estimation parameter 1107 (1115).

Next, among the inspection images, the inspection image 1116 determined as the defect candidate by 1115 is input to the overdetection determination portion, and it is determined whether the inspection image 1116 is overdetected or non-overdetected, and then the image determined to be non-overdetected is output as a defect image 1120 (1117: the same as 125 in FIG. 1).

Next, among the inspection images, the inspection image 1118 determined as the non-defect candidate by 1115 is input to the normality determination portion, and it is determined whether the inspection image 1118 is normal or abnormal, and then the image determined to be abnormal is output as a defect image 1120 (1119). The defect image 1120 is confirmed by the inspector (1121), and when there is a defect or the like, countermeasures are fed back to the manufacturing process.

The general problem is that there are variations in brightness and shape among defective products, so defective portions that are similar in appearance to those of the non-defective products are often determined (defect-overlooking) as non-defects. In the pass/fail determination process, the normal portion in the non-defective product or the overlooked portion in the defective product is determined as a non-defect candidate. Therefore, when it is possible to determine whether the part determined as a non-defect candidate in the pass/fail determination process is normal or abnormal, a defective portion that has been overlooked in the past can be detected by setting the part determined to be abnormal as a defect.

Figure 13:
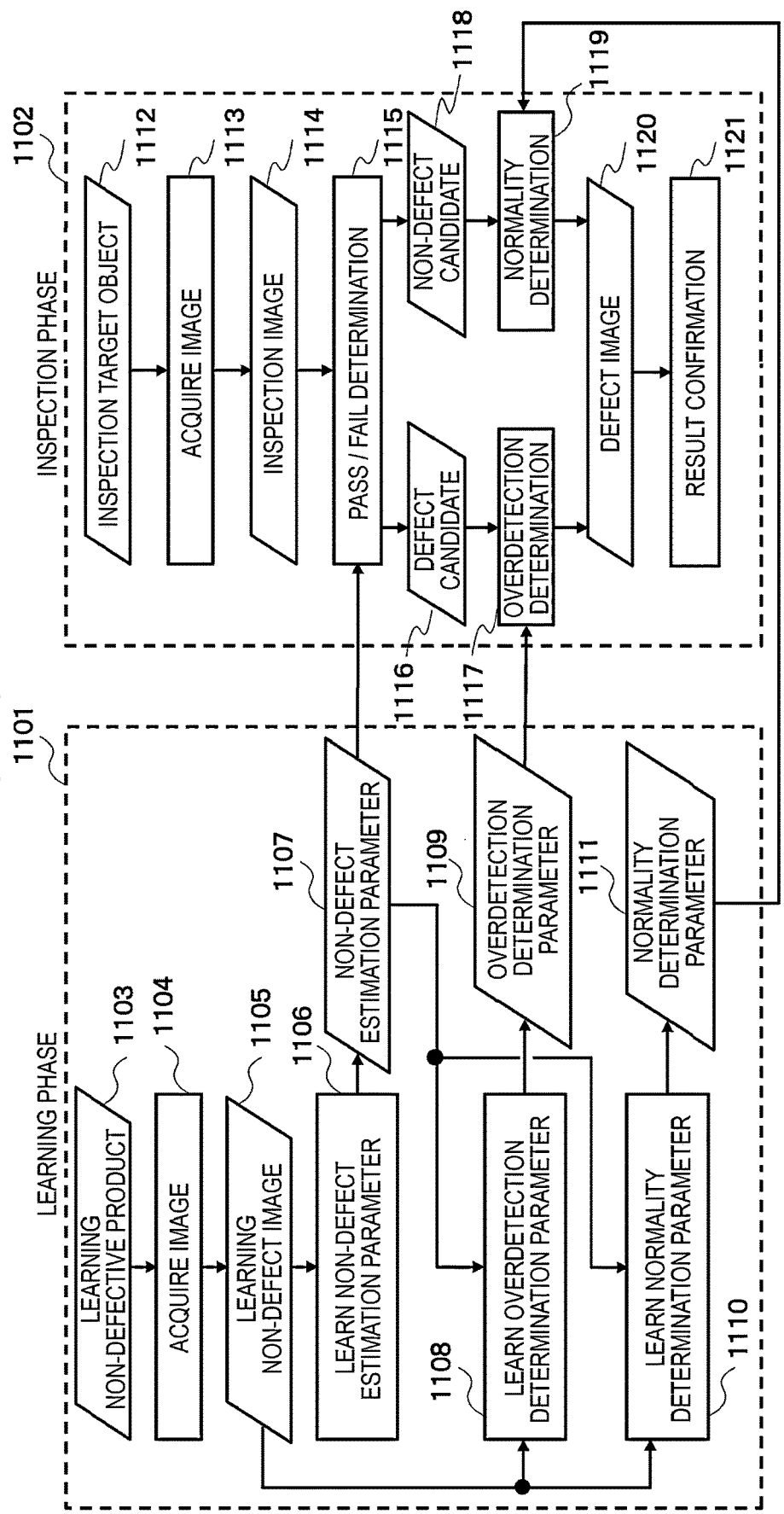
FIG. 13 is a diagram illustrating an example of an overall processing sequence of the visual inspection device according to the second example.

Thus, according to the example illustrated in FIGS. 12 and 13, in automating visual inspection using machine learning, when learning using only images of non-defective products, it is possible to reduce overdetection of non-defective portions having a significantly different appearance from those of typical non-defective products, and to reduce overlooking of defective portions having similar appearances to those of non-defective products. This makes it possible to inspect whether the inspection target object is a non-defective product or a defective product with high accuracy.

9. GUI

FIG. 14 illustrates an example of a graphical user interface (GUI) for a user such as an inspector to select a first image from defect candidate images when specifying the number of times of learnings of the non-defect estimation parameter and overdetection determination parameter and learning the overdetection determination parameter in the visual inspection device 10 of the first example and the second example described above.

In this GUI 1201, a pass/fail determination result 1202 of the learning non-defect image is displayed. As an example, FIG. 14 illustrates pass/fail determination results 1203, 1204, and 1205 of three learning non-defect images.

The GUI 1201 displays an input portion 1206 which specifies parameters used in the learning phase of the visual inspection device. The input portion 1206 is composed of an input portion 1207 that specifies the number of times N1 of learnings of the non-defect estimation parameter, an input portion 1208 that specifies the pass/fail determination threshold value TH, and an input portion 1209 that specifies the number of times N2 of learnings of the overdetection determination parameter.

The GUI 1201 displays a selection portion 1210 for a user such as an inspector to select a first image from defect candidate images when learning the overdetection determination parameter. The selection portion 1210 includes a defect candidate image display portion 1211 for displaying a defect candidate image, an add button 1218, a return button 1219, and a first image display portion 1220 for displaying the first image.

When a user such as an inspector selects a defect candidate image displayed on the defect candidate image display portion 1211 and presses the add button 1218, the selected image is added to the first image. Further, when a user such as an inspector selects the first image displayed on the first image display portion 1220 and presses the return button 1219, the selected image is excluded from the first image. FIG. 14 illustrates defect candidate images 1212 to 1217 and first images 1221 to 1223 as examples.

10. Summary

As described above, in the present embodiment, in automating visual inspection using machine learning, a mechanism to determine whether an image determined as a defect candidate by the pass/fail determination is overdetected or non-overdetected, and output the image determined to be non-overdetected as a defect is provided. This makes it possible to reduce overdetection of non-defective portions whose appearance is significantly different from that of a typical non-defective product. In addition, a mechanism to determine whether an image determined as a non-defect candidate by the pass/fail determination is normal or abnormal, and output the image determined to be abnormal as a defect is provided. As a result, it is possible to reduce overlooking of defective portions having a similar appearance to that of a non-defective product. That is, it is possible to inspect whether the inspection target object is a non-defective product or a defective product with high accuracy.

11. Others

In the example described above, the configuration is described in detail in order to describe the present invention in an easy-to-understand manner, and the example is not necessarily limited to the one including all the described configurations. Further, it is possible to add, delete, or replace a part of the configuration of each example with other configurations.

As an example, in the present embodiment, two-dimensional image data is treated as input information. However, the present invention can also be applied when a one-dimensional signal such as an ultrasonic received wave or a three-dimensional volume data acquired by a laser range finder or the like is used as input information.

Further, each of the above-described configurations, functions, processing portions, processing means and the like may be realized by hardware by designing a part or all of them as, for example, an integrated circuit. The present invention can also be realized by a software program code that realizes the functions of the examples. In this case, a storage medium in which the program code is recorded is provided to the computer, and the processor included in the computer reads out the program code stored in the storage medium. In this case, the program code itself read from the storage medium realizes the function of the above-described example, and thus the program code itself and the storage medium storing the program code configure the present invention. Examples of the storage medium for supplying such a program code include a flexible disk, a CD-ROM, a DVD-ROM, a hard disk, a solid state drive (SSD), an optical disk, a magneto-optical disk, a CD-R, a magnetic tape, a non-volatile memory card, and a ROM.

In addition, the program code that realizes the functions described in the example can be implemented in a wide range of programs or script languages such as assembler, C/C++, perl, Shell, PHP, Java (registered trademark), and Python.

Further, all or part of the program code of the software that realizes the functions of each example may be stored in the memory 12 in advance. Further, if necessary, all or part of the program code may be stored in the memory 12 from a non-temporary storage device of another device connected to the network, or from a non-temporary storage medium via an external I/F (not illustrated) included in the inspection visual device 10.

Further, by distributing the program code of the software that realizes the functions of the example via the network, the program code may be stored in storage means such as a hard disk or memory of a computer or a storage medium such as a CD-RW or CD-R, and then the processor provided in the computer may read and execute the program code stored in the storage means or the storage medium.

In the above-described examples, regarding the control lines and information lines, what is considered necessary for description is shown, and not all control lines and information lines are shown in terms of the product. All configurations may be interconnected.

What is claimed is:

1. A computer which determines whether a target object is a non-defective product or a defective product,
wherein the computer has a processor, and the processor executes operations including:
learning, by a neural network, an overdetection determination parameter using a learning non-defect image,
learning, by the neural network, a non-defect estimation parameter using the learning non-defect image,
acquiring an inspection image of the target object,
determining, based on the non-defect estimation parameter, whether the inspection image is the inspection image of a non-defect candidate or the inspection image of a defect candidate,
determining, based on the overdetection determination parameter, whether the inspection image determined as the defect candidate is overdetected or not overdetected, and
outputting the defect candidate as a defect image only when the defect candidate is determined to be not overdetected,
wherein the learning the overdetection determination parameter includes:
setting the inspection image of the defect candidate as a defect candidate image for each of a plurality of defect candidates,
selecting a first image from the defect candidate images, and
setting a region from the learning non-defect image as a second image, and
wherein the overdetection determination parameter is learned so as to determine that the first image is overdetected and the second image is not overdetected.

2. The computer according to claim 1,
wherein the learning the overdetection determination parameter includes
selecting a first image from a plurality of learning non-defect images determined as the inspection image of the defect candidate, and
selecting a second image from the learning non-defect images, wherein the second image is different from the first image, and
wherein the overdetection determination parameter is learned so as to determine that the first image is overdetected and the second image is not overdetected.

3. The computer according to claim 1,
wherein the learning the overdetection determination parameter includes
setting the inspection image of the defect candidate as a first image, and
setting the inspection image of the non-defect candidate as a second image, and
wherein the overdetection determination parameter is learned so as to determine that the first image is overdetected and the second image is not overdetected.

4. The computer according to claim 1,
wherein the non-defect estimation parameter is learned by using, in addition to the learning non-defect image, the inspection image of the non-defect candidate that is determined as being overdetected and the inspection image of the defect candidate that is determined as being not overdetected.

5. The computer according to claim 1,
wherein, by estimating a pseudo non-defect image from the inspection image using the non-defect estimation parameter and calculating a difference image between the inspection image and the pseudo non-defect image, it is determined whether the inspection image is the inspection image of the non-defect candidate or the inspection image of the defect candidate.

6. The computer according to claim 5,
wherein the overdetection determination parameter is learned using the difference image and the learning non-defect image.

7. The computer according to claim 1, comprising:
determining whether the inspection image is the inspection image having normality or the inspection image having abnormality opposite to normality based on the inspection image determined as the inspection image of the non-defect candidate of the inspection images; and
learning a normality determination parameter used in the normality determining using the learning non-defect image,
wherein by using the learning non-defect image as the inspection image, the normality determination parameter is learned so that the inspection image of a non-defect candidate is determined as the inspection image with normality, and the inspection image of a defect candidate is determined as the inspection image with abnormality.

8. A visual inspection method which is executed by a computer for determining whether a target object is a non-defective product or a defective product, the method comprising:
   learning, by a neural network, an overdetection determination parameter using a learning non-defect image;
   learning, by the neural network, a non-defect estimation parameter using the learning non-defect image;
   acquiring an inspection image of the target object;
   determining, based on the non-defect estimation parameter, whether the inspection image acquired in the image acquiring is the inspection image of a non-defect candidate or the inspection image of a defect candidate;
   determining, based on the overdetection determination parameter, whether the inspection image determined as the defect candidate is overdetected or not overdetected; and
   outputting the defect candidate as a defect image only when the defect candidate is determined to be not overdetected;
   wherein the learning the overdetection determination parameter includes:
      setting the inspection image of the defect candidate as a defect candidate image for each of a plurality of defect candidates,
      selecting a first image from the defect candidate images, and
      setting a region from the learning non-defect image as a second image, and
   wherein the overdetection determination parameter is learned so as to determine that the first image is overdetected and the second image is not overdetected.

9. The visual inspection method according to claim 8,
wherein the learning the overdetection determination parameter includes,
setting the inspection image of the defect candidate as a defect candidate image for each of a plurality of defect candidates,
selecting a first image from the defect candidate images, and
setting the inspection image of the non-defect candidate as a second image, and
wherein the overdetection determination parameter is learned so as to determine that the first image is overdetected and the second image is not overdetected.

10. The visual inspection method according to claim 8,
wherein the learning the overdetection determination parameter includes
selecting a first image from a plurality of learning non-defect images determined as the inspection image of the defect candidate, and
selecting a second image from the learning non-defect images, wherein the second image is different from the first image, and
wherein the overdetection determination parameter is learned so as to determine that the first image is overdetected and the second image is not overdetected.

11. The visual inspection method according to claim 8,
wherein the learning the overdetection determination parameter includes setting the inspection image of the defect candidate as a first image, and setting the inspection image of the non-defect candidate as a second image, and
wherein the overdetection determination parameter is learned so as to determine that the first image is overdetected and the second image is not overdetected.

12. The visual inspection method according to claim 8,
wherein the non-defect estimation parameter is learned by using, in addition to the learning non-defect image, the inspection image of the non-defect candidate that is determined as being overdetected and the inspection image of the defect candidate that is determined as being not overdetected.

13. The visual inspection method according to claim 8,
wherein, by estimating a pseudo non-defect image from the inspection image using the non-defect estimation parameter and calculating a difference image between the inspection image and the pseudo non-defect image, it is determined whether the inspection image is the inspection image of the non-defect candidate or the inspection image of the defect candidate.

* * * * *